(12) United States Patent
Leblond et al.

(10) Patent No.: US 11,308,528 B2
(45) Date of Patent: Apr. 19, 2022

(54) BLUEPRINTING OF MULTIMEDIA ASSETS

(71) Applicant: SDL Netherlands B.V., Amsterdam Zuidoost (NL)

(72) Inventors: Dominique Leblond, Nieuw-Vennep (NL); Lars Møllebjerg, Amsterdam (NL); Oleksandra Popova, Amsterdam (NL)

(73) Assignee: SDL Netherlands B.V., Amsterdam Zuidoost (NL)

( * ) Notice: Subject to any disclaimer, the term of this patent is extended or adjusted under 35 U.S.C. 154(b) by 0 days.

(21) Appl. No.: 13/886,199

(22) Filed: May 2, 2013

(65) Prior Publication Data

US 2014/0081775 A1   Mar. 20, 2014

Related U.S. Application Data

(63) Continuation of application No. 13/619,591, filed on Sep. 14, 2012, now abandoned.

(51) Int. Cl.
  *G06Q 30/02*   (2012.01)
  *G06F 16/95*   (2019.01)
  *G06F 9/451*   (2018.01)

(52) U.S. Cl.
  CPC ......... *G06Q 30/0277* (2013.01); *G06F 9/454* (2018.02); *G06F 16/95* (2019.01); *G06Q 30/0201* (2013.01)

(58) Field of Classification Search
  None
  See application file for complete search history.

(56) References Cited

U.S. PATENT DOCUMENTS

| | | |
|---|---|---|
| 4,845,658 A | 7/1989 | Gifford |
| 4,916,614 A | 4/1990 | Kaji |

(Continued)

FOREIGN PATENT DOCUMENTS

| | | | |
|---|---|---|---|
| AU | 5240198 A | 5/1998 |
| AU | 694367 B2 | 7/1998 |

(Continued)

OTHER PUBLICATIONS

"Inheritance (object-oriented programming)", archived Wikipedia on Sep. 4, 2011, http://en.wikipedia.org/w/index.php?title=Inheritance_(object-oriented_programming)&oldid=448382925.*

(Continued)

*Primary Examiner* — Kambiz Abdi
*Assistant Examiner* — Scott Snider
(74) *Attorney, Agent, or Firm* — Carr & Ferrell LLP

(57) ABSTRACT

Content management systems that utilize blueprinting and external content libraries are described herein. Methods for managing a web-based marketing campaign using a blueprint may include establishing a blueprint for a web-based marketing campaign using a content management system, the blueprint having rules for managing assets utilized by at least a portion of a plurality of publications of a hierarchical model of the web-based marketing campaign, the plurality of publications having at least one parent publication and at least one child publication. In some instances, a portion of the assets utilized by the hierarchical model are stored on an external content library. The methods may also include determining a change in at least one asset for the at least one parent publication, and automatically inheriting the change in the at least one asset for the at least one parent publication to the at least one child publication according to the blueprint.

23 Claims, 9 Drawing Sheets

(56) References Cited

U.S. PATENT DOCUMENTS

| | | | |
|---|---|---|---|
| 4,920,499 | A | 4/1990 | Skeirik |
| 5,075,850 | A | 12/1991 | Asahioka et al. |
| 5,295,068 | A | 3/1994 | Nishino et al. |
| 5,351,189 | A | 9/1994 | Doi |
| 5,418,717 | A | 5/1995 | Su et al. |
| 5,477,451 | A | 12/1995 | Brown et al. |
| 5,497,319 | A | 3/1996 | Chong et al. |
| 5,640,575 | A | 6/1997 | Maruyama |
| 5,644,775 | A | 7/1997 | Thompson et al. |
| 5,675,802 | A | 10/1997 | Allen et al. |
| 5,708,780 | A | 1/1998 | Levergood et al. |
| 5,715,314 | A | 2/1998 | Payne et al. |
| 5,724,424 | A | 3/1998 | Gifford |
| 5,751,957 | A | 5/1998 | Hiroya et al. |
| 5,774,868 | A | 6/1998 | Cragun et al. |
| 5,812,776 | A | 9/1998 | Gifford |
| 5,813,007 | A | 9/1998 | Nielsen |
| 5,873,056 | A | 2/1999 | Liddy |
| 5,884,097 | A | 3/1999 | Li et al. |
| 5,884,246 | A | 3/1999 | Boucher et al. |
| 5,894,554 | A | 4/1999 | Lowery et al. |
| 5,895,446 | A | 4/1999 | Takeda et al. |
| 5,909,492 | A | 6/1999 | Payne et al. |
| 5,966,685 | A | 10/1999 | Flanagan et al. |
| 5,974,372 | A | 10/1999 | Barnes |
| 5,978,828 | A | 11/1999 | Greer et al. |
| 5,987,401 | A | 11/1999 | Trudeau |
| 5,987,402 | A | 11/1999 | Murata et al. |
| 6,026,413 | A | 2/2000 | Challenger et al. |
| 6,041,333 | A | 3/2000 | Bretschneider et al. |
| 6,041,360 | A | 3/2000 | Himmel et al. |
| 6,044,344 | A | 3/2000 | Kanevsky |
| 6,049,785 | A | 4/2000 | Gifford |
| 6,085,162 | A | 7/2000 | Cherny |
| 6,092,035 | A | 7/2000 | Kurachi et al. |
| 6,108,703 | A | 8/2000 | Leighton et al. |
| 6,122,666 | A | 9/2000 | Beurket et al. |
| 6,128,652 | A | 10/2000 | Toh et al. |
| 6,128,655 | A | 10/2000 | Fields et al. |
| 6,161,082 | A | 12/2000 | Goldberg et al. |
| 6,163,785 | A | 12/2000 | Carbonell et al. |
| 6,195,649 | B1 | 2/2001 | Gifford |
| 6,199,051 | B1 | 3/2001 | Gifford |
| 6,205,437 | B1 | 3/2001 | Gifford |
| 6,212,634 | B1 | 4/2001 | Geer et al. |
| 6,216,212 | B1 | 4/2001 | Challenger et al. |
| 6,219,818 | B1 | 4/2001 | Freivald et al. |
| 6,256,712 | B1 | 7/2001 | Challenger et al. |
| 6,263,332 | B1 | 7/2001 | Nasr et al. |
| 6,278,969 | B1 | 8/2001 | King et al. |
| 6,279,112 | B1 | 8/2001 | O'toole, Jr. et al. |
| 6,330,566 | B1 | 12/2001 | Durham |
| 6,330,598 | B1 | 12/2001 | Beckwith et al. |
| 6,338,033 | B1 | 1/2002 | Bourbonnais et al. |
| 6,347,316 | B1 | 2/2002 | Redpath |
| 6,356,865 | B1 | 3/2002 | Franz et al. |
| 6,356,903 | B1 | 3/2002 | Baxter et al. |
| 6,363,337 | B1 | 3/2002 | Amith |
| 6,401,105 | B1 | 6/2002 | Carlin et al. |
| 6,415,257 | B1 | 7/2002 | Junqua |
| 6,438,540 | B2 | 8/2002 | Nasr et al. |
| 6,449,599 | B1 | 9/2002 | Payne et al. |
| 6,477,524 | B1 | 11/2002 | Taskiran |
| 6,477,575 | B1 | 11/2002 | Koeppel et al. |
| 6,490,358 | B1 | 12/2002 | Geer et al. |
| 6,490,563 | B2 | 12/2002 | Hon |
| 6,526,426 | B1 | 2/2003 | Lakritz |
| 6,581,061 | B2 | 6/2003 | Graham |
| 6,623,529 | B1 | 9/2003 | Lakritz |
| 6,658,627 | B1 | 12/2003 | Gallup |
| 6,725,333 | B1 | 4/2004 | Degenaro et al. |
| 6,748,569 | B1 | 6/2004 | Brooke et al. |
| 6,782,384 | B2 | 8/2004 | Sloan et al. |
| 6,865,528 | B1 | 3/2005 | Huang |
| 6,920,419 | B2 | 7/2005 | Kitamura |
| 6,973,656 | B1 | 12/2005 | Huynh et al. |
| 6,976,207 | B1 | 12/2005 | Rujan |
| 6,990,439 | B2 | 1/2006 | Xun |
| 7,013,264 | B2 | 3/2006 | Dolan |
| 7,031,908 | B1 | 4/2006 | Huang |
| 7,050,964 | B2 | 5/2006 | Menzes |
| 7,076,494 | B1 * | 7/2006 | Baer ..................... G06F 16/95 |
| 7,089,493 | B2 | 8/2006 | Hatori et al. |
| 7,111,229 | B2 | 9/2006 | Nicholas et al. |
| 7,124,092 | B2 | 10/2006 | O'toole, Jr. et al. |
| 7,177,792 | B2 | 2/2007 | Knight |
| 7,191,447 | B1 | 3/2007 | Ellis et al. |
| 7,207,005 | B2 | 4/2007 | Laktritz |
| 7,209,875 | B2 | 4/2007 | Quirk |
| 7,249,013 | B2 | 7/2007 | Al-Onaizan |
| 7,249,314 | B2 | 7/2007 | Walker et al. |
| 7,272,639 | B1 | 9/2007 | Levergood et al. |
| 7,295,962 | B2 | 11/2007 | Marcu |
| 7,295,963 | B2 | 11/2007 | Richardson et al. |
| 7,302,429 | B1 | 11/2007 | Wanker |
| 7,333,927 | B2 | 2/2008 | Lee |
| 7,340,388 | B2 | 3/2008 | Soricut |
| 7,353,165 | B2 | 4/2008 | Zhou |
| 7,369,984 | B2 | 5/2008 | Fairweather |
| 7,383,320 | B1 * | 6/2008 | Silberstein et al. .......... 709/219 |
| 7,389,222 | B1 | 6/2008 | Langmead |
| 7,389,223 | B2 | 6/2008 | Atkin |
| 7,448,040 | B2 | 11/2008 | Ellis et al. |
| 7,454,326 | B2 | 11/2008 | Marcu |
| 7,464,086 | B2 | 12/2008 | Black et al. |
| 7,509,313 | B2 | 3/2009 | Colledge |
| 7,516,062 | B2 | 4/2009 | Chen et al. |
| 7,533,013 | B2 | 5/2009 | Marcu |
| 7,606,814 | B2 | 10/2009 | Deily et al. |
| 7,620,538 | B2 | 11/2009 | Marcu |
| 7,620,549 | B2 | 11/2009 | Di Cristo |
| 7,624,005 | B2 | 11/2009 | Koehn |
| 7,668,782 | B1 | 2/2010 | Reistad et al. |
| 7,680,647 | B2 | 3/2010 | Moore |
| 7,698,126 | B2 | 4/2010 | Kohlmeier et al. |
| 7,716,037 | B2 | 5/2010 | Precoda |
| 7,734,459 | B2 | 6/2010 | Menezes |
| 7,739,102 | B2 | 6/2010 | Bender |
| 7,739,286 | B2 | 6/2010 | Sethy |
| 7,788,087 | B2 | 8/2010 | Corston-Oliver |
| 7,813,918 | B2 | 10/2010 | Muslea |
| 7,836,057 | B1 | 11/2010 | Micaelian et al. |
| 7,836,110 | B1 | 11/2010 | Schoenbach et al. |
| 7,865,358 | B2 | 1/2011 | Green |
| 7,904,595 | B2 | 3/2011 | Cheng et al. |
| 7,925,493 | B2 | 4/2011 | Watanabe |
| 7,945,437 | B2 | 5/2011 | Mount et al. |
| 7,949,633 | B1 | 5/2011 | Shaver et al. |
| 7,958,453 | B1 | 6/2011 | Taing |
| 7,983,896 | B2 | 7/2011 | Ross |
| 7,983,897 | B2 | 7/2011 | Chin |
| 8,015,222 | B2 | 9/2011 | Abnous et al. |
| 8,036,929 | B1 | 10/2011 | Reisman |
| 8,078,450 | B2 | 12/2011 | Anisimovich et al. |
| 8,135,575 | B1 | 3/2012 | Dean |
| 8,185,830 | B2 | 5/2012 | Saha et al. |
| 8,195,447 | B2 | 6/2012 | Anismovich |
| 8,214,196 | B2 | 7/2012 | Yamada |
| 8,239,186 | B2 | 8/2012 | Chin |
| 8,239,207 | B2 | 8/2012 | Seligman |
| 8,260,846 | B2 | 9/2012 | Lahav |
| 8,286,185 | B2 | 10/2012 | Ellis et al. |
| 8,296,127 | B2 | 10/2012 | Marcu |
| 8,296,463 | B2 | 10/2012 | Cheng et al. |
| 8,346,585 | B1 | 1/2013 | Griffith et al. |
| 8,352,244 | B2 | 1/2013 | Gao et al. |
| 8,364,463 | B2 | 1/2013 | Miyamoto |
| 8,386,234 | B2 | 2/2013 | Uchimoto et al. |
| 8,413,045 | B2 | 4/2013 | Lemonik et al. |
| 8,423,346 | B2 | 4/2013 | Seo et al. |
| 8,442,812 | B2 | 5/2013 | Ehsani |
| 8,453,052 | B1 | 5/2013 | Newman et al. |
| 8,489,980 | B2 | 7/2013 | Lakritz |
| 8,521,506 | B2 | 8/2013 | Lancaster et al. |

(56) References Cited

U.S. PATENT DOCUMENTS

| | | |
|---|---|---|
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,635,327 B1 | 1/2014 | Levergood et al. |
| 8,635,539 B2 | 1/2014 | Young |
| 8,666,725 B2 | 3/2014 | Och |
| 8,671,214 B2 | 3/2014 | Lockhart et al. |
| 8,676,804 B1 | 3/2014 | Janos et al. |
| 8,683,329 B2 | 3/2014 | Tang et al. |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,799,200 B2 | 8/2014 | Lahav |
| 8,818,790 B2 | 8/2014 | He et al. |
| 8,843,359 B2 | 9/2014 | Lauder |
| 8,862,456 B2 | 10/2014 | Krack et al. |
| 8,898,052 B2 | 11/2014 | Waibel |
| 8,903,707 B2 | 12/2014 | Zhao |
| 8,909,683 B1 * | 12/2014 | Ledet .............. G06F 16/958 707/804 |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,954,539 B2 | 2/2015 | Lahav |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,092,405 B1 | 7/2015 | Hayden |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,317,622 B1 | 4/2016 | Zuromski et al. |
| 9,336,487 B2 | 5/2016 | Lahav |
| 9,369,489 B2 | 6/2016 | Kato |
| 9,396,184 B2 | 7/2016 | Roy |
| 9,396,436 B2 | 7/2016 | Lahav |
| 9,430,449 B2 | 8/2016 | Leblond et al. |
| 9,465,797 B2 | 10/2016 | Ji |
| 9,471,563 B2 | 10/2016 | Trese |
| 9,471,920 B2 | 10/2016 | Kolkowitz et al. |
| 9,519,640 B2 | 12/2016 | Perez |
| 9,519,682 B1 | 12/2016 | Pujara et al. |
| 9,547,626 B2 | 1/2017 | de Voogd |
| 9,552,355 B2 | 1/2017 | Dymetman |
| 9,596,188 B2 | 3/2017 | Cheng et al. |
| 9,600,473 B2 | 3/2017 | Leydon |
| 9,613,026 B2 | 4/2017 | Hodson |
| 9,773,270 B2 | 9/2017 | Costa et al. |
| 9,781,050 B2 | 10/2017 | Cheng et al. |
| 9,954,794 B2 | 4/2018 | Cheng et al. |
| 10,007,646 B1 | 6/2018 | Colborn et al. |
| 10,025,776 B1 | 7/2018 | Sjoberg et al. |
| 10,061,749 B2 | 8/2018 | Homer et al. |
| 10,452,740 B2 | 10/2019 | Leblond et al. |
| 10,521,492 B2 | 12/2019 | Homer et al. |
| 10,572,928 B2 | 2/2020 | Costa et al. |
| 10,580,015 B2 | 3/2020 | Erasmus et al. |
| 10,614,167 B2 | 4/2020 | Bondarchuk et al. |
| 10,657,540 B2 | 5/2020 | Martchenko et al. |
| 10,678,866 B1 | 6/2020 | Ranganathan et al. |
| 10,990,644 B2 | 4/2021 | Homer et al. |
| 11,044,949 B2 | 6/2021 | Homer et al. |
| 11,080,493 B2 | 8/2021 | Bondarchuk et al. |
| 11,182,455 B2 | 11/2021 | Siddiquee et al. |
| 2001/0029507 A1 | 10/2001 | Nojima |
| 2002/0007383 A1 | 1/2002 | Yoden et al. |
| 2002/0010590 A1 | 1/2002 | Lee |
| 2002/0023101 A1 | 2/2002 | Kurihara et al. |
| 2002/0046018 A1 | 4/2002 | Marcu |
| 2002/0065848 A1 | 5/2002 | Walker et al. |
| 2002/0083103 A1 | 6/2002 | Ballance |
| 2002/0103698 A1 | 8/2002 | Cantrell |
| 2002/0112013 A1 | 8/2002 | Walsh |
| 2002/0120762 A1 | 8/2002 | Cheng et al. |
| 2002/0124109 A1 | 9/2002 | Brown |
| 2002/0178166 A1 | 11/2002 | Hsia |
| 2002/0178257 A1 | 11/2002 | Cerrato |
| 2002/0193983 A1 | 12/2002 | Tokieda et al. |
| 2003/0009320 A1 | 1/2003 | Furuta |
| 2003/0023757 A1 | 1/2003 | Ishioka et al. |
| 2003/0158953 A1 | 8/2003 | Lal |
| 2003/0163346 A1 | 8/2003 | Tinti et al. |
| 2003/0200094 A1 | 10/2003 | Gupta |
| 2004/0010496 A1 | 1/2004 | Behrendt et al. |
| 2004/0015723 A1 | 1/2004 | Pham et al. |
| 2004/0019849 A1 | 1/2004 | Weng et al. |
| 2004/0034520 A1 | 2/2004 | Langkilde-Geary |
| 2004/0039593 A1 | 2/2004 | Eskandar |
| 2004/0044517 A1 | 3/2004 | Palmquist |
| 2004/0044576 A1 | 3/2004 | Kurihara et al. |
| 2004/0068435 A1 | 4/2004 | Braunzell |
| 2004/0148409 A1 | 7/2004 | Davis et al. |
| 2004/0187090 A1 | 9/2004 | Meacham |
| 2004/0255281 A1 | 12/2004 | Imamura et al. |
| 2005/0039116 A1 | 2/2005 | Slack-Smith |
| 2005/0086105 A1 | 4/2005 | McFadden et al. |
| 2005/0156714 A1 | 7/2005 | McCarthy et al. |
| 2005/0171944 A1 | 8/2005 | Palmquist |
| 2005/0187774 A1 | 8/2005 | Vuong |
| 2005/0189415 A1 | 9/2005 | Fano et al. |
| 2005/0203884 A1 | 9/2005 | Allen et al. |
| 2005/0228865 A1 | 10/2005 | Hirsch |
| 2005/0235351 A1 | 10/2005 | Seltzer et al. |
| 2005/0246283 A1 | 11/2005 | Gwiazda et al. |
| 2006/0041558 A1 * | 2/2006 | McCauley ........ G06F 17/30309 |
| 2006/0053367 A1 | 3/2006 | Chen et al. |
| 2006/0080257 A1 | 4/2006 | Vaughan et al. |
| 2006/0080265 A1 | 4/2006 | Hinds et al. |
| 2006/0080397 A1 | 4/2006 | Chene et al. |
| 2006/0095443 A1 | 5/2006 | Kumar et al. |
| 2006/0095526 A1 | 5/2006 | Levergood et al. |
| 2006/0178918 A1 | 8/2006 | Mikurak |
| 2006/0248442 A1 | 11/2006 | Rosenstein et al. |
| 2006/0282255 A1 | 12/2006 | Lu |
| 2007/0016363 A1 | 1/2007 | Huang et al. |
| 2007/0022003 A1 | 1/2007 | Chao et al. |
| 2007/0033104 A1 | 2/2007 | Collins et al. |
| 2007/0043553 A1 | 2/2007 | Dolan |
| 2007/0047781 A1 | 3/2007 | Hull et al. |
| 2007/0048714 A1 | 3/2007 | Plastina et al. |
| 2007/0083425 A1 | 4/2007 | Cousineau et al. |
| 2007/0112553 A1 | 5/2007 | Jacobson |
| 2007/0118545 A1 | 5/2007 | Chandrasekharan et al. |
| 2007/0192374 A1 * | 8/2007 | Abnous ............... G06F 16/972 |
| 2007/0208991 A1 | 9/2007 | Rider |
| 2007/0209005 A1 | 9/2007 | Shaver et al. |
| 2007/0209080 A1 | 9/2007 | Ture et al. |
| 2007/0226058 A1 | 9/2007 | Lorenzen et al. |
| 2007/0234213 A1 | 10/2007 | Krikorian et al. |
| 2008/0028300 A1 * | 1/2008 | Krieger ............... G06Q 10/10 715/255 |
| 2008/0086298 A1 | 4/2008 | Anismovich |
| 2008/0109374 A1 | 5/2008 | Levergood et al. |
| 2008/0120089 A1 | 5/2008 | Schurig |
| 2008/0120090 A1 | 5/2008 | Schurig |
| 2008/0120120 A1 | 5/2008 | Cirulli et al. |
| 2008/0154577 A1 | 6/2008 | Kim |
| 2008/0195664 A1 | 8/2008 | Maharajh et al. |
| 2008/0201344 A1 | 8/2008 | Levergood et al. |
| 2008/0209320 A1 | 8/2008 | Mawhinney et al. |
| 2008/0244053 A1 | 10/2008 | Sampson et al. |

(56) References Cited

U.S. PATENT DOCUMENTS

| | | |
|---|---|---|
| 2008/0256235 A1* | 10/2008 | Or Sim ................. H04H 60/31 709/224 |
| 2008/0270398 A1 | 10/2008 | Landau et al. |
| 2008/0288240 A1 | 11/2008 | D'Agostini et al. |
| 2008/0316228 A1 | 12/2008 | Seljavaara |
| 2009/0061764 A1 | 3/2009 | Lockhart et al. |
| 2009/0094017 A1 | 4/2009 | Chen et al. |
| 2009/0099931 A1 | 4/2009 | Aaltonen et al. |
| 2009/0138458 A1 | 5/2009 | Wanker |
| 2009/0171780 A1 | 7/2009 | Aldrey et al. |
| 2009/0197580 A1 | 8/2009 | Gupta et al. |
| 2009/0217196 A1 | 8/2009 | Neff et al. |
| 2009/0217352 A1 | 8/2009 | Shen et al. |
| 2009/0234711 A1* | 9/2009 | Ramer ............... G06F 17/30749 705/14.66 |
| 2009/0240539 A1 | 9/2009 | Slawson |
| 2009/0248801 A1 | 10/2009 | Then et al. |
| 2009/0259684 A1 | 10/2009 | Knight et al. |
| 2009/0313005 A1 | 12/2009 | Jaquinta |
| 2009/0313245 A1 | 12/2009 | Weyl et al. |
| 2010/0017704 A1 | 1/2010 | Jaffe et al. |
| 2010/0023475 A1 | 1/2010 | Lahav |
| 2010/0023581 A1 | 1/2010 | Lahav |
| 2010/0057439 A1 | 3/2010 | Ideuchi et al. |
| 2010/0057561 A1 | 3/2010 | Gifford |
| 2010/0070364 A1 | 3/2010 | Dugan |
| 2010/0070843 A1 | 3/2010 | Duym |
| 2010/0070847 A1 | 3/2010 | Hampton et al. |
| 2010/0121630 A1 | 5/2010 | Mende et al. |
| 2010/0153404 A1 | 6/2010 | Ghosh et al. |
| 2010/0179803 A1 | 7/2010 | Sawaf |
| 2010/0211865 A1 | 8/2010 | Fanning et al. |
| 2010/0217783 A1 | 8/2010 | Farver et al. |
| 2010/0233996 A1 | 9/2010 | Herz et al. |
| 2010/0242069 A1 | 9/2010 | Jung et al. |
| 2010/0257457 A1 | 10/2010 | De Goes |
| 2010/0274661 A1 | 10/2010 | Aaltonen et al. |
| 2010/0281008 A1 | 11/2010 | Braunwarth |
| 2010/0305940 A1 | 12/2010 | Dendi et al. |
| 2010/0306402 A1 | 12/2010 | Russell et al. |
| 2010/0312619 A1 | 12/2010 | Ala-Pietila et al. |
| 2011/0010243 A1 | 1/2011 | Wilburn et al. |
| 2011/0022381 A1* | 1/2011 | Gao ..................... G06F 17/2818 704/7 |
| 2011/0047468 A1 | 2/2011 | Ishizaka |
| 2011/0060998 A1 | 3/2011 | Schwartz et al. |
| 2011/0066469 A1 | 3/2011 | Kadosh |
| 2011/0078626 A1 | 3/2011 | Bachman et al. |
| 2011/0097693 A1 | 4/2011 | Crawford |
| 2011/0099077 A1 | 4/2011 | Darin et al. |
| 2011/0125783 A1 | 5/2011 | Whale et al. |
| 2011/0161312 A1 | 6/2011 | Wallman |
| 2011/0191458 A1 | 8/2011 | Cheng et al. |
| 2011/0264736 A1 | 10/2011 | Zuckerberg et al. |
| 2011/0270975 A1 | 11/2011 | Troup |
| 2011/0313754 A1 | 12/2011 | Bastide et al. |
| 2011/0320395 A1* | 12/2011 | Dada ..................... G06Q 30/02 706/47 |
| 2012/0016655 A1* | 1/2012 | Travieso ............... G06F 16/9558 704/2 |
| 2012/0022852 A1 | 1/2012 | Tregaskis |
| 2012/0023129 A1 | 1/2012 | Vedula et al. |
| 2012/0042006 A1 | 2/2012 | Kiley et al. |
| 2012/0096366 A1 | 4/2012 | Narla et al. |
| 2012/0131441 A1 | 5/2012 | Jitkoff et al. |
| 2012/0136718 A1 | 5/2012 | Katti |
| 2012/0143816 A1 | 6/2012 | Zhang et al. |
| 2012/0158485 A1 | 6/2012 | Ogawa |
| 2012/0185759 A1 | 7/2012 | Balinsky et al. |
| 2012/0197718 A1 | 8/2012 | Martchenko et al. |
| 2012/0197770 A1 | 8/2012 | Raheja et al. |
| 2012/0197957 A1 | 8/2012 | de Voogd |
| 2012/0198351 A1 | 8/2012 | Lee et al. |
| 2012/0203861 A1 | 8/2012 | Flack et al. |
| 2012/0216108 A1 | 8/2012 | Yambal et al. |
| 2012/0221319 A1* | 8/2012 | Trese ................... G06F 17/2836 704/2 |
| 2012/0221407 A1* | 8/2012 | Erasmus et al. ............ 705/14.43 |
| 2012/0226818 A1 | 9/2012 | Atas et al. |
| 2012/0233665 A1 | 9/2012 | Ranganathan et al. |
| 2012/0266076 A1 | 10/2012 | Lockhart et al. |
| 2012/0330644 A1 | 12/2012 | Giraudy et al. |
| 2012/0330990 A1 | 12/2012 | Chen et al. |
| 2013/0031470 A1 | 1/2013 | Daly, Jr. et al. |
| 2013/0036202 A1 | 2/2013 | Lahav |
| 2013/0054404 A1 | 2/2013 | Garcia |
| 2013/0067055 A1 | 3/2013 | Cheng et al. |
| 2013/0091014 A1 | 4/2013 | Kellogg |
| 2013/0097488 A1 | 4/2013 | Coman et al. |
| 2013/0124185 A1 | 5/2013 | Sarr et al. |
| 2013/0124987 A1 | 5/2013 | Lakritz |
| 2013/0144566 A1 | 6/2013 | De Biswas |
| 2013/0151940 A1 | 6/2013 | Bailor et al. |
| 2013/0173247 A1 | 7/2013 | Hodson |
| 2013/0238392 A1* | 9/2013 | Sloan ..................... G06Q 50/01 705/7.29 |
| 2013/0262986 A1 | 10/2013 | Leblond et al. |
| 2013/0282859 A1 | 10/2013 | McDonald |
| 2013/0304607 A1 | 11/2013 | Costa et al. |
| 2013/0325442 A1 | 12/2013 | Dahlmeier |
| 2013/0326345 A1 | 12/2013 | Haggart et al. |
| 2014/0019625 A1 | 1/2014 | Cheng et al. |
| 2014/0058718 A1 | 2/2014 | Kunchukuttan |
| 2014/0082032 A1 | 3/2014 | Leblond et al. |
| 2014/0087760 A1 | 3/2014 | Bennett |
| 2014/0114864 A1* | 4/2014 | Babich ................. G06F 16/188 705/304 |
| 2014/0142917 A1 | 5/2014 | D'Penha |
| 2014/0142918 A1 | 5/2014 | Dotterer |
| 2014/0173414 A1 | 6/2014 | Chan et al. |
| 2014/0181013 A1 | 6/2014 | Micucci et al. |
| 2014/0188993 A1 | 7/2014 | Klein et al. |
| 2014/0229257 A1 | 8/2014 | Reistad et al. |
| 2014/0236942 A1 | 8/2014 | Li |
| 2014/0250369 A1 | 9/2014 | Mitnick et al. |
| 2014/0278342 A1 | 9/2014 | Shoshan et al. |
| 2014/0282977 A1 | 9/2014 | Madhu et al. |
| 2014/0297252 A1 | 10/2014 | Prasad et al. |
| 2014/0297759 A1 | 10/2014 | Mody |
| 2014/0298483 A1 | 10/2014 | Kato |
| 2014/0303956 A1 | 10/2014 | Wilson |
| 2014/0304080 A1 | 10/2014 | Yilmaz |
| 2014/0310229 A1 | 10/2014 | Lahav |
| 2014/0351053 A1 | 11/2014 | Link |
| 2014/0358519 A1 | 12/2014 | Mirkin |
| 2014/0358524 A1 | 12/2014 | Papula |
| 2014/0365201 A1 | 12/2014 | Gao |
| 2015/0040000 A1 | 2/2015 | Rice et al. |
| 2015/0051896 A1 | 2/2015 | Simard |
| 2015/0052424 A1 | 2/2015 | Sikchi et al. |
| 2015/0074518 A1 | 3/2015 | Rumsey et al. |
| 2015/0106390 A1 | 4/2015 | Fuchs |
| 2015/0127660 A1 | 5/2015 | Zilberberg et al. |
| 2015/0149455 A1 | 5/2015 | Whitley, Jr. |
| 2015/0149885 A1 | 5/2015 | Homer et al. |
| 2015/0149886 A1 | 5/2015 | Homer et al. |
| 2015/0186362 A1 | 7/2015 | Li |
| 2015/0188961 A1 | 7/2015 | Ricci |
| 2015/0213259 A1 | 7/2015 | Du et al. |
| 2015/0213363 A1 | 7/2015 | Lahav |
| 2015/0248484 A1 | 9/2015 | Yu et al. |
| 2015/0254732 A1 | 9/2015 | Snyder |
| 2015/0310504 A1 | 10/2015 | Potter |
| 2016/0014088 A1 | 1/2016 | Maekawa |
| 2016/0019546 A1 | 1/2016 | Eisen |
| 2016/0057195 A1 | 2/2016 | Jaskiewicz |
| 2016/0155178 A1 | 6/2016 | Konaiyagarri et al. |
| 2016/0239496 A1 | 8/2016 | Motte et al. |
| 2016/0248785 A1 | 8/2016 | Petry et al. |
| 2016/0275057 A1 | 9/2016 | Dendi et al. |
| 2016/0283952 A1 | 9/2016 | Hall |
| 2016/0371693 A1 | 12/2016 | Kolkowitz et al. |
| 2017/0124069 A1 | 5/2017 | Bondarchuk et al. |

(56) References Cited

U.S. PATENT DOCUMENTS

| | | |
|---|---|---|
| 2017/0149683 A1 | 5/2017 | Cheng et al. |
| 2017/0235848 A1 | 8/2017 | Van Dusen et al. |
| 2017/0337614 A1 | 11/2017 | Costa et al. |
| 2018/0314674 A1 | 11/2018 | Homer et al. |
| 2019/0065514 A1 | 2/2019 | Siddiquee et al. |
| 2019/0158567 A1 | 5/2019 | Siddiquee et al. |
| 2019/0163459 A1 | 5/2019 | Sreenivasa et al. |
| 2020/0104343 A1 | 4/2020 | Homer et al. |
| 2020/0151740 A1 | 5/2020 | Martchenko et al. |
| 2020/0167529 A1 | 5/2020 | Bondarchuk et al. |
| 2022/0043868 A1 | 2/2022 | Siddiquee et al. |

FOREIGN PATENT DOCUMENTS

| | | | |
|---|---|---|---|
| AU | 5202299 A | 10/1999 | |
| CA | 2221506 A1 | 12/1996 | |
| CN | 102193914 A | 9/2011 | |
| CN | 102662935 A | 9/2012 | |
| CN | 102902667 A | 1/2013 | |
| DE | 69525374 T2 | 8/2002 | |
| DE | 69431306 T2 | 5/2003 | |
| DE | 69633564 T2 | 11/2005 | |
| EP | 0830774 A2 | 3/1998 | |
| EP | 1128301 A2 | 8/2001 | |
| EP | 1128302 A2 | 8/2001 | |
| EP | 1128303 A2 | 8/2001 | |
| EP | 0803103 A1 | 2/2002 | |
| EP | 1235177 A2 | 8/2002 | |
| EP | 0734556 B1 | 9/2002 | |
| EP | 0830774 B1 | 10/2004 | |
| EP | 1489523 A2 | 12/2004 | |
| EP | 1170680 | 8/2005 | |
| EP | 2299369 A1 | 3/2011 | |
| EP | 2668599 | 12/2013 | |
| EP | 2668626 | 12/2013 | |
| EP | 2678814 | 1/2014 | |
| EP | 2896007 | 7/2015 | |
| EP | 2896008 | 7/2015 | |
| EP | 2896007 B1 | 7/2020 | |
| GB | 2241359 A | 8/1991 | |
| JP | H10509543 A | 9/1998 | |
| JP | H11507752 A | 7/1999 | |
| JP | 2001117847 A | 4/2001 | |
| JP | 2001136583 A | 5/2001 | |
| JP | 3190881 B2 | 7/2001 | |
| JP | 3190882 B2 | 7/2001 | |
| JP | 2001188992 A | 7/2001 | |
| JP | 2001350790 A | 12/2001 | |
| JP | 3260693 B2 | 2/2002 | |
| JP | 2002073677 A | 3/2002 | |
| JP | 2002132822 A | 5/2002 | |
| JP | 3367675 B2 | 1/2003 | |
| JP | 2003032660 A | 1/2003 | |
| JP | 2003157402 A | 5/2003 | |
| JP | 2003216608 A | 7/2003 | |
| JP | 2004538542 A | 12/2004 | |
| JP | 2005056080 A | 3/2005 | |
| JP | 2005174120 A | 6/2005 | |
| JP | 2005267535 A | 9/2005 | |
| JP | 3762882 B2 | 4/2006 | |
| JP | 2006216073 A | 8/2006 | |
| JP | 2006260329 A | 9/2006 | |
| JP | 2007042127 A | 2/2007 | |
| JP | 2008027265 A | 2/2008 | |
| JP | 2009020845 A | 1/2009 | |
| JP | 2009518761 A | 5/2009 | |
| JP | 2009538489 A1 * | 11/2009 | ........... G06F 16/288 |
| JP | 2009301480 A | 12/2009 | |
| JP | 4485548 B2 | 6/2010 | |
| JP | 2010152588 A | 7/2010 | |
| JP | 2011002905 A | 1/2011 | |
| JP | 4669373 B2 | 4/2011 | |
| JP | 4669430 B2 | 4/2011 | |
| JP | 5952307 | 7/2016 | |
| JP | 5952312 | 7/2016 | |
| JP | 6138054 B2 | 6/2017 | |
| WO | WO9516971 A1 | 6/1995 | |
| WO | WO9613013 A1 | 5/1996 | |
| WO | WO9642041 A2 | 12/1996 | |
| WO | WO9715885 A1 | 5/1997 | |
| WO | WO9819224 A2 | 5/1998 | |
| WO | WO9952626 A1 | 10/1999 | |
| WO | WO2002039318 A1 | 5/2002 | |
| WO | WO20030081441 | 2/2003 | |
| WO | WO-2004057464 A2 * | 7/2004 | ............ G06F 9/454 |
| WO | WO2007068123 A1 | 6/2007 | |
| WO | WO20070118424 A1 | 10/2007 | |
| WO | WO2010062540 A1 | 6/2010 | |
| WO | WO2010062542 A1 | 6/2010 | |
| WO | WO2012101240 | 8/2012 | |
| WO | WO2012101243 | 8/2012 | |
| WO | WO2012113791 | 8/2012 | |
| WO | WO2013144358 | 10/2013 | |
| WO | WO2013167734 | 11/2013 | |
| WO | WO2014041148 | 3/2014 | |
| WO | WO2014041149 | 3/2014 | |

OTHER PUBLICATIONS

Fausd, Juan, "Website Localization and Multilingual CMS", Globalization Partners International, Mar. 24, 2011 https://www.globalizationpartners.com/201 Jan. 3, 24/website-localization-and-multilingual-cms/ (Year: 2011).*

Pendo, Joshua, "Best way to translate database driven content", Stack Overflow, Mar. 14, 2012, https://stackoverflow.com/questions/9705287/best-way-to-translate-database-driven-content (Year: 2012).*

"The GNU Make Manual", Version 3.79, edition 0.55, Apr. 2000, Free Software Foundation, Inc, 137 pages.

Rational Software Corporation, "Introduction to ClearCase", Dec. 1999, Rational ClearCase, Release 4.0. 78 pages.

Rational Software Corporation, "Administering ClearCase", Rational ClearCase Release 4.0, 1999, 419 pages.

Challenger et al., "A Scalable System for Consistently Caching Dynamic Web Data", INFOCOM '99. Eighteenth Annual Joint Conference of the IEEE Computerand Communications Societies. Proceedings. IEEE, Mar. 21-25, 1999, pp. 294-303, vol. 1, 10 pages.

Challenger et al., "A Publishing System for Efficiently Creating Dynamic Web Content", INFOCOM 2000. Nineteenth Annual Joint Conference of the IEEE Computerand Communications Societies. Proceedings. IEEE, Mar. 26-30, 2000, vol. 2. 10 pages.

Croll et al., "Content Management—The Users Requirements", International Broadcasting Convention, Conference Publication No. 447, Sep. 12-16, 1997, 4 pages.

IDIOM, Inc. "WorldServer 2 White Paper", 2000, 19 pages.

Market Wire. "VerticalNet Selects Uniscape as Globalization Provider to Speed Global Expansion", Jun. 2000, <www.findarticles.com/p/articles/mi_pwwi/is_200006/ai_mark01011558/print> accessed on Oct. 1, 2005, 2 pages.

PRNewsWire and News desk. "Personify Selects Uniscape to Enable Ebusiness Solutions for Global Markets", Aug. 30, 2000, <www.findwealth.com/personify-selects-uniscape-to-enable-180593pr.html> accessed on Oct. 1, 2005, 2 pages.

Uniscape, Inc. "Uniscape, Inc. Home Page", publicly posted Feb. 20, 1999, <web.archive.org/web/19990220195249//http://www.uniscape-inc.com/> accessed on Oct. 1, 2005, 2 pages.

Business Wire. "Uniscape Introduces Pilot Program to Provide Multilingual Website Management Solutions," Feb. 11, 1999, <www.findarticles.com/p/articles/mi_m0EIN/is_1999_Feb_11/11/ai_53852378> accessed on May 9, 2011, 1 page.

Business Wire. "Uniscape Announces New Solution for Automating Management of Software Localization Process," Aug. 17, 1998, <www.findarticles.com/p/articles/mi_m0EIN/is_1998_August_17/ai_21090247> accessed on Sep. 30, 2005, 2 pages.

Market Wire. "Cephren Relies on Uniscape During Rapid Global eBusiness Expansion," Oct. 18, 2000, <www.marketwire.com/mw/iwpr?id=18115&cat=te> accessed on Oct. 1, 2005, 2 pages.

My Yahoo—RSS Headlines Module—Frequently Asked Questions. XP002508567. Dec. 17, 2008.

(56) References Cited

OTHER PUBLICATIONS

Unidex, Inc.: "XML Convert," Aug. 4, 2007, <http://www.unidex.com/xflat.htm> accessed on Apr. 5, 2012, 1 page.
Wikipedia—"SOAP," Jan. 22, 2011, <http://en.wikipedia.org/w/index.php?title=SOAP&oldid=409349976> accessed on Apr. 4, 2012, 5 pages.
Mutz et al., "User-Agent Display Attributes," HTTP Working Group, Nov. 26, 1996, 6 pages.
XP007905525, The Technical Aspects Identified in the Present Application (Art. 15 PCT) are considered part of common general knowledge. Due to their notoriety no documentary evidence is found to be required. Official Journal Nov. 2007, p. 592.
International Search Report and Written Opinion dated Apr. 26, 2012 in application No. PCT/EP2012/051284, filed Jan. 27, 2012.
International Search Report and Written Opinion dated May 15, 2012 in application No. PCT/EP2012/052934, filed Feb. 21, 2012.
International Search Report and Written Opinion dated May 2, 2012 in application No. PCT/EP2012/051291, filed Jan. 27, 2012.
International Search Report and Written Opinion dated Oct. 23, 2013 in Patent Cooperation Treaty application No. PCT/EP2013/056842, filed Mar. 29, 2013 pp. 1, 3-6, 8-10.
International Search Report and Written Opinion dated Jan. 8, 2014 in Patent Cooperation Treaty application No. PCT/EP2013/069078, filed Sep. 14, 2013 pp. 1, 3-7.
International Search Report and Written Opinion dated Jan. 8, 2014 in Patent Cooperation Treaty application No. PCT/EP2013/069077, filed Sep. 14, 2013 pp. 1, 3, 4, 6-8.
Colligan et al.; Special Edition Using Microsoft Office Frontpage 2003; 2004; Que Publishing; pp. 50-91 and 323-326.
"Highlight;" Microsoft Computer Dictionary; May 1, 2002; Microsoft Press; p. 320.
First Examination Report dated Jun. 17, 2014 in European Patent Convention application No. 12707723.8, filed Feb. 21, 2012, pp. 1, 3-6.
Summons to Attend Oral Proceedings dated Feb. 11, 2015 in European Patent Convention application No. 1270772.8, filed Feb. 21, 2012.
Final Office Action, dated Sep. 23, 2015, U.S. Appl. No. 13/016,989, filed Jan. 29, 2011.
Non-Final Office Action, dated Jun. 8, 2015, U.S. Appl. No. 13/436,656, filed Mar. 30, 2012.
Advisory Action, dated Jun. 29, 2015, U.S. Appl. No. 13/609,293, filed Sep. 11, 2012.
Non-Final Office Action, dated Sep. 29, 2015, U.S. Appl. No. 14/023,384, filed Sep. 10, 2013.
Non-Final Office Action, dated Oct. 30, 2015, U.S. Appl. No. 14/091,329, filed Nov. 26, 2013.
Result of Consultation dated May 28, 2015 in European Patent Convention application No. 12707723.8, filed Feb. 21, 2012.
Decision to Refuse dated Jun. 29, 2015 in European Patent Application 12707723.8 filed Feb. 21, 2012.
Minutes of Oral Proceeding dated Jun. 29, 2015 in European Patent Application 12707723.8 filed Feb. 21, 2012.
Non-Final Office Action, dated Sep. 28, 2016, U.S. Appl. No. 13/016,989, filed Jan. 29, 2011.
Final Office Action, dated Oct. 6, 2016, U.S. Appl. No. 13/035,852, filed Feb. 25, 2011.
Advisory Action, dated Nov. 29, 2016, U.S. Appl. No. 13/035,852, filed Feb. 25, 2011.
Notice of Allowance, dated Aug. 24, 2016, U.S. Appl. No. 13/016,988, filed Jan. 29, 2011.
Non-Final Office Action, dated Nov. 28, 2016, U.S. Appl. No. 13/891,029, filed May 9, 2013.
Notice of Allowance, dated Nov. 7, 2016, U.S. Appl. No. 13/609,293, filed Sep. 11, 2012.
Final Office Action, dated Jul. 12, 2016, U.S. Appl. No. 13/886,194, filed May 2, 2013.
Final Office Action, dated Oct. 31, 2016, U.S. Appl. No. 13/886,194, filed May 2, 2013.
Non-Final Office Action, dated Nov. 28, 2016, U.S. Appl. No. 14/023,384, dated Sep. 10, 2013.
Advisory Action, dated Sep. 8, 2016, U.S. Appl. No. 14/091,329, filed Nov. 26, 2013.
Non-Final Office Action, dated Jul. 14, 2016, U.S. Appl. No. 14/093,015, filed Nov. 28, 2013.
Final Office Action, dated Nov. 3, 2016, U.S. Appl. No. 14/093,015, filed Nov. 28, 2013.
Advisory Action, dated Jan. 13, 2017, U.S. Appl. No. 14/093,015, filed Nov. 28, 2013.
Non-Final Office Action, dated Jan. 18, 2017, U.S. Appl. No. 14/091,329, filed Nov. 26, 2013.
Final Office Action, dated Jan. 24, 2017, U.S. Appl. No. 13/886,194, filed May 2, 2013.
Advisory Action, dated Feb. 9, 2017, U.S. Appl. No. 14/093,015, filed Nov. 28, 2013.
"Krishnan, ""Unmittelbare Ergenbnisse Noch Schneller: Google Vorschau—Der Google Produkt-Kompass,"" Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages."
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from http://aclanthology.info/volumes/proceedings-of-the-seventh-workshop-onstatistical-machine-translation.
Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from Proceedings of the Seventh Workshop on Statistical Machine Translation. Retrieved from http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine Translation, Jun. 7, 2012, pp. 96-103. Retrieved at http://aclanthology info/volumes/proceedings-of-the-seventh-workshop-onstatistical-machine-translation.
Gonzalfz-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from http://aclanthology.info/volumes/proceedings-of-the-seventh-workshop-onstatistical-machine-translation.
Hardmeier et al. "Tree Kernels for Machine Translation Quality Estimation" [W12-3112] Proceedings of the Seventh Workshop on Statistical Machine Translation,Jun. 7, 2012, pp. 109-113. Retrieved from http://aclanthology.info/volumes/proceedings-of-the-seventh-workshop-onstatistical-machine-translation.
Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved

(56) References Cited

OTHER PUBLICATIONS from http://aclanthology.info/volumes/proceedings-of-the-seventh-workshop-onstatistical-machine-translation.
Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from http://aclanthology.info/volumes/proceedings-of-the-seventh-workshop-onstatistical-machine-translation.
Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from http://aclanthology.info/volumes/proceedings-of-the-seventh-workshop-onstatistical-machine-translation.
Popovic, Maja. "Morpheme- and POS-based IBM1 and language model scores for tanslation quality estimation" Proceedings of the Seventh Workshop on Statistical Machine Translation, Jun. 7, 2012, pp. 133-137. Retrieved from http://aclanthology.info/volumes/proceedings-of-the-seventh-workshop-onstatistical-machine-translation.
Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from http://aclanthology.info/volumes/proceedings-of-the-seventh-workshop-onstatistical-machine-translation.
Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from http://aclanthology.info/volumes/proceedings-of-the-seventh-workshop-onstatistical-machine-translation.
Wu et al. "Regression with Phrase Indicators for Estimating MT Quality" [W12-3119] Proceedings of the Seventh Workshop on Statistical Machine Translation, Jun. 7, 2012, pp. 152-156. Retrieved from http://aclanthology.info/volumes/proceedings-of-the-seventh-workshop-onstatistical-machine-translation.
Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.
"Best Practices—Knowledge Base," Lilt website [online], Mar. 6, 2017 [retrieved on Oct. 19, 2017], Retrieved from the Internet:<https://lilt.com/kb/translators/best-practices>, 2 pages.
"Data Security—Knowledge Base," Lilt website [online], Oct. 14, 2016 [retrieved on Oct. 19, 2017], Retrieved from the Internet:<https://lilt.com/kb/security>, 1 pages.
"Data Security and Confidentiality," Lilt website [online], 2017 [retrieved on Oct. 19, 2017], Retrieved from the Internet: <https://lilt.com/security>, 7 pages.
"Memories—Knowledge Base," Lilt website [online], Jun. 7, 2017 [retrieved on Oct. 19, 2017], Retrieved from the Internet:<https://lilt.com/kb/project-managers/memory>, 4 pages.
"Memories (API)—Knowledge Base," Lilt website [online], Jun. 2, 2017 [retrieved on Oct. 19, 2017], Retrieved from the Internet:<https://lilt.com/kb/api/memories>, 1 page.
"Quoting—Knowledge Base," Lilt website [online], Jun. 7, 2017 [retrieved on Oct. 19, 2017], Retrieved from the Internet: <https://lilt.com/kb/project-managers/quoting>, 4 pages.
"The Editor—Knowledge Base," Lilt website [online], Aug. 15, 2017 [retrieved on Oct. 19, 2017], Retrieved from the Internet:<https://lilt.com/kb/translators/editor>, 5 pages.
"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.
"What is Lilt_—Knowledge Base," Lilt website [online],Dec. 15, 2016 [retrieved on Oct. 19, 2017], Retrieved from the Internet:<https://lilt.com/kb/what-is-lilt>, 1 page.
"Getting Started—Knowledge Base," Lilt website [online], Apr. 11, 2017 [retrieved on Oct. 20, 2017], Retrieved from the Internet:<https://lilt.com/kb/translators/getting-started>, 2 pages.
"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.
"Lilt API_API Reference," Lilt website [online], retrieved on Oct. 20, 2017, Retrieved from the Internet:<https://lilt.com/docs/api>, 53 pages.
"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.
"Projects—Knowledge Base," Lilt website [online], Jun. 7, 2017, retrieved on Oct. 20, 2017, Retrieved from the Internet: <https://lilt.com/kb/project-managers/projects>, 3 pages.
"Getting Started with lilt," Lilt website [online], May 30, 2017, retrieved on Oct. 20, 2017, Retrieved from the Internet: <https://lilt.com/kb/api/lilt-js>, 6 pages.
"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.
Hilderbrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information_retrieval.
Och et al., "The Alignment Template Approach to Statistical Machine Translation Machine Translation," Computational Linguistics, vol. 30, No. 4, Dec. 1, 2004, pp. 417-442 (39 pages with citations). Retrieved from http://dl.acm.org/citation.cfm?id=1105589.
Sethy et al., "Building Topic Specific Language Models FromWebdata Using Competitive Models," Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.
Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.
Business Wire, "Language Weaver Introduces User-Managed Customization Tool," Oct. 25, 2005, 3 pages. Retrieved from http:ProQuest.
Winiwarter, W., "Learning Transfer Rules for Machine Translation from Parallel Corpora," Journal of Digital Information Management, vol. 6 No. 4, Aug. 2008, pp. 285-293. Retrieved from http://www.researchgate.net/publication/220608987_Learning_Transfer_Rules_for_Machine_Translation_from_Parallel_Corpora.
Potet et al., "Preliminary Experiments on Using Users' Post-Editions to Enhance a SMT System," Proceedings of the European Association for Machine Translation (EAMT), May 2011, pp. 161-168. Retrieved from Retrieved at http://www.mt-archive.info/EAMT-2011-Potet.pdf.
Ortiz-Martinez et al., "An Interactive Machine Translation System with Online Learning" Proceedings of the ACL-HLT 2011 System Demonstrations, Jun. 21, 2011, pp. 68-73. Retrieved from http://www.actweb.org/anthology/P11-4012.
Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.
Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.

(56) References Cited

OTHER PUBLICATIONS

Levenberg et al."Stream-based Translation Models for Statistical Machine Translation" Human Language Technologies: The 2010 Annual Conference of the North American Chapter of the ACL, Dec. 31, 2010, pp. 394-402.
Lagarda et al. "Statistical Post-Editing of a Rule Based Machine Translation System" Proceedings of NAACL HLT 2009: Short Papers, Jun. 2009, pp. 217-220.
Ehara, "Rule Based Machine Translation Combined with Statistical Post Editor for Japanese to English Patent Translation," MT Summit XI, 2007, pp. 13-18.
Bechara et al. "Statistical Post-Editing for a Statistical MT System" Proceedings of the 13th Machine Translation Summit, 2011, pp. 308-315.
Summons to Attend Oral Proceedings, European Patent Application No. 12703483.3, dated Nov. 30, 2017, 11 pages.
"Web analytics," Wikipedia [online], Jan. 27, 2001 [retrieved on Sep. 11, 2017], Retrieved from the Internet: <URL: https://en.wikipedia.org/w/index.php?title=Web_analytics&oldid=410384013>, 11 pages.
"Examining Division Preliminary Opinion," European Patent Application No. 12703483.3, dated Apr. 30, 2018, 9 pages.
"Decision to Refuse," European Patent Application No. 12703483.3, dated Jun. 19, 2018, 24 pages.
"Minutes of Oral Proceeding", European Patent Application No. 12703483.3, dated Jun. 19, 2018, 4 pages.
"Summons to Attend Oral Proceedings," European Patent Application No. 12703482.5, dated Feb. 14, 2018, 10 pages.
"Office Action," European Patent Application No. 13776975.8, dated Jun. 4, 2018, 11 pages.
"Decision to Refuse," European Patent Application No. 12703482.5, dated Sep. 17, 2018, 4 pages.
Leblond, Dominique, "Blueprinting of Multimedia Assets", U.S. Appl. No. 13/619,591, filed Sep. 14, 2012, 40 pages.
"Summons to Attend Oral Proceedings," European Patent Application No. 13776975.8, dated Jul. 2, 2019, 18 pages.
Wikipedia: "XML" [online], [retrieved on Mar. 2, 2020], Retrieved from the Internet: <https://www.wikipedia.com/XML>, 2 pages.
"Notice of Allowance," European Patent Application No. 13776975.8, dated Feb. 12, 2020, 7 pages.
Eckerson, Wayne, "Performance Management Strategies: How to Create and Deploy Effective Metrics," TDWI Best Practices Report, First Quarter (2009), 35 pages.
Padmanabhan et al., "Using Predictive Prefetching to Improve World Wide Web Latency," ACM SIGCOMM Computer Communication Review 26.3, 1996, pp. 22-36.
Hasegawa et al., "Multilingual Disaster Information System: Information Delivery Using Graphic Text for Mobile Phones," AI & Soc 19, 2005, pp. 265-278.
"Serialization (C#)", Microsoft, <https://msdn.microsoft.com/en-us/library/mt656716.aspx>, Jan. 2, 2020, 4 pages.
"What are object serialization and deserialization?" Stack Overflow, <http://stackoverflow.com/questions/1360632/object-serialization-anddeserialization>, Sep. 1, 2009, 6 pages.
"Java Serialization and Deserialization", Studytonight, <http://www.studytonight.com/java/serialization-and-deserialization.php>, 2020, Accessed Oct. 23, 2020, 7 pages.
Upadhyay, Chirantan, "Serialization and Deserialization in ASP. NET with C#", Code Project, <https://www.codeproject.com/kb/cs/seranddeserialization.aspx>, May 27, 2009, 7 pages.
"Serialize", PHP, <http://php.net/manual/en/function.serialize.php>, accessed Oct. 23, 2020, 28 pages.
"Interface Serializable", Oracle, <http://docs.oracle.com/javase/7/docs/api/java/io/Serializable.html>, accessed Oct. 23, 2020, 3 pages.
Sakai, Marie et al., "Building DITA-based CMS as integrated documentation environment", The 6th International Conference on Soft Computing and Intelligent Systems, and The 13th International Symposium on Advanced Intelligence Systems, IEEE, 2012, 5 pages.
"Oracle ATG Platform Programming Guide"; Oracle Corporation; retrieved on Jan. 19, 2021 from <URL:https://docs.oracle.com/cd/E35319_01/Platform.10-2/ATGPlatformProgGuide/html/s0101introduction01.html>, 2013, 2 pages.
Christensson, Per. "HTML Definition." TechTerms. Sharpened Productions, <URL:https://techterms.com/definition/html>, May 23, 2015, 2 pages.
Adomavicius et al., "Context-Aware Recommender Systems", AI Magazine, 2011, 14 pages.
Final Office Action, dated Apr. 20, 2017, U.S. Appl. No. 13/016,989, filed Jan. 29, 2011.
Advisory Action, dated Apr. 28, 2017, U.S. Appl. No. 13/886,194, filed May 2, 2013.
Notice of Allowance, dated May 9, 2017, U.S. Appl. No. 13/891,029, filed May 9, 2013.
Notice of Allowance, dated Jun. 14, 2017, U.S. Appl. No. 14/023,384, dated Sep. 10, 2013.
Non-Final Office Action, dated Jun. 15, 2017, U.S. Appl. No. 13/035,852, filed Feb. 25, 2011.
Advisory Action, dated Jun. 23, 2017, U.S. Appl. No. 13/886,194, filed May 2, 2013.
Non-Final Office Action, dated Jul. 11, 2017, U.S. Appl. No. 15/423,305, filed Feb. 2, 2017.
Schafer, Ben J. et al., "Recommender Systems in E-Commerce," Proceedings of the 1st ACM conference on Electronic Commerce (EC '99), ACM, New York, NY, 1999, pp. 158-166.
Notice of Allowance dated May 24, 2016 in Japanese Patent Application 2013-550888 filed Jan. 27, 2012, pp. 1-3.
Notice of Allowance dated May 24, 2016 in Japanese Patent Application 2013-554869 filed Feb. 21, 2012, pp. 1-3.
Preview; Feb. 26, 2011; Dictionary.com; pp. 1-2.
Edgar; "Why Do Browsers Display My Site Differently?" Jun. 3, 2009 (updated Nov. 2010); matthewedgar.net; pp. 1-5.
Office Action dated Jan. 5, 2016 in Japanese Patent Application 2013-550887 filed Jul. 26, 2013.
Office Action dated Dec. 22, 2015 in Japanese Patent Application 2013-550888 filed Jan. 27, 2012.
Office Action dated Feb. 9, 2016 in Japanese Patent Application 2013-554869 filed Feb. 21, 2012.
Wikipedia; "Serialization"; Nov. 14, 2013; 10 pages; https://web.archive.org/web/20131114152415/http://en.wikipedia.org/wiki/Serialization.
Microsoft, MSDN; "Serialization .NET Framework 4.5"; Jan. 10, 2013; 2 pages; https://web.archive.org/web/20130110102559/http://msdn.microsoft.com/en-us/library/7ay27kt9(v=vs. 110).aspx.
European Patent Application No. 12703483.3, "Office Action," dated Jan. 25, 2017, 7 pages.
"Notice of Allowance," Japan Patent Application No. 2013-550887, dated Apr. 11, 2017, 3 pages.
Japan Patent Application No. 2013-550887, "Office Action," dated Oct. 4, 2016, 4 pages [8 pages including translation].
European Patent Application No. 12703482.5, "Office Action," dated Sep. 6, 2016, 4 pages.

\* cited by examiner

BLUEPRINTING OF MULTIMEDIA ASSETS

CROSS REFERENCE TO RELATED APPLICATIONS

This application is a continuation of U.S. patent application Ser. No. 13/619,591, filed Sep. 14, 2012, entitled "Blueprinting of Multimedia Assets." The disclosure of the aforementioned application is incorporated herein by reference.

FIELD OF THE PRESENT TECHNOLOGY

The present technology relates generally to web content management and web content management systems, and more specifically, but not by way of limitation, to web content management systems and methods that employ blueprinting to manage multi-faceted and/or multi-channel online marketing campaigns.

BACKGROUND

Managing multi-channel and/or multi-dimensional online marketing campaigns can be an onerous task. For example, ensuring that changes in assets in one or more publications of a multi-faceted (e.g., online marketing campaign having a plurality of publications such as web pages, campaign mobile advertisements, social media communications, products, microsites, and so forth) online marketing campaign are appropriately shared and/or inherited through the online marketing campaign is an important, yet tedious endeavor. Inconsistent content delivery of media assets across the web marketing campaign may result in a sloppy product presentation and unpredictable brand communication to customers. Thus, it may be advantageous for each publication within the marketing campaign to be treated as either a unique site or as a parent/child structure that can hide, inherit, localize and publish data from other related sites/structures. What is needed is an architecture that enables business communication professionals to effortlessly use shared resources across multiple publications, while retaining control over content that makes each site unique.

SUMMARY OF THE PRESENT TECHNOLOGY

According to some embodiments, the present technology may be directed to methods for managing a web-based marketing campaign using a blueprint. These methods may comprise the steps of: (a) establishing a blueprint for a web-based marketing campaign using a content management system, the blueprint comprising rules for managing assets utilized by at least a portion of a plurality of publications of a hierarchical model of the web-based marketing campaign, the plurality of publications comprising at least one parent publication and at least one child publication, at least a portion of the assets utilized by the hierarchical model being stored on an external content library; (b) determining a change in at least one asset for the at least one parent publication; and (c) automatically inheriting the change in the at least one asset for the at least one parent publication to the at least one child publication.

According to additional embodiments, the present technology may be directed to methods for managing a web-based marketing campaign using a blueprint. These methods may comprise the steps of: (a) establishing a blueprint for a web-based marketing campaign using a content management system, the blueprint comprising rules for managing assets utilized by at least a portion of a plurality of publications of a semantic model of the web-based marketing campaign, the blueprint comprising rules for localizing assets for each of the plurality of publications, at least a portion of the assets being stored on an external content library; (b) determining a change in at least one asset for at least one of the plurality of publications; and (c) automatically inheriting the change in the at least one asset for the at least one of the plurality of publications to a dependent publication, according to the blueprint.

According to additional embodiments, the present technology may be directed to methods for managing a web-based marketing campaign using a blueprint. These systems may comprise: (a) a memory for storing executable instructions; and (b) a processor for executing the executable instructions, the executable instructions comprising: (i) a blueprinting module that establishes a blueprint for a web-based marketing campaign using a content management system, the blueprint comprising rules for managing assets utilized by at least a portion of a plurality of publications of a hierarchical model of the web-based marketing campaign, the plurality of publications comprising at least one parent publication and at least one child publication, at least a portion of the assets utilized by the hierarchical model being stored on an external content library; (ii) an asset manager module that receives a change in at least one asset for the at least one parent publication; and (iii) wherein the blueprinting module automatically inherits the change in the at least one asset for the at least one parent publication to the at least one child publication.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
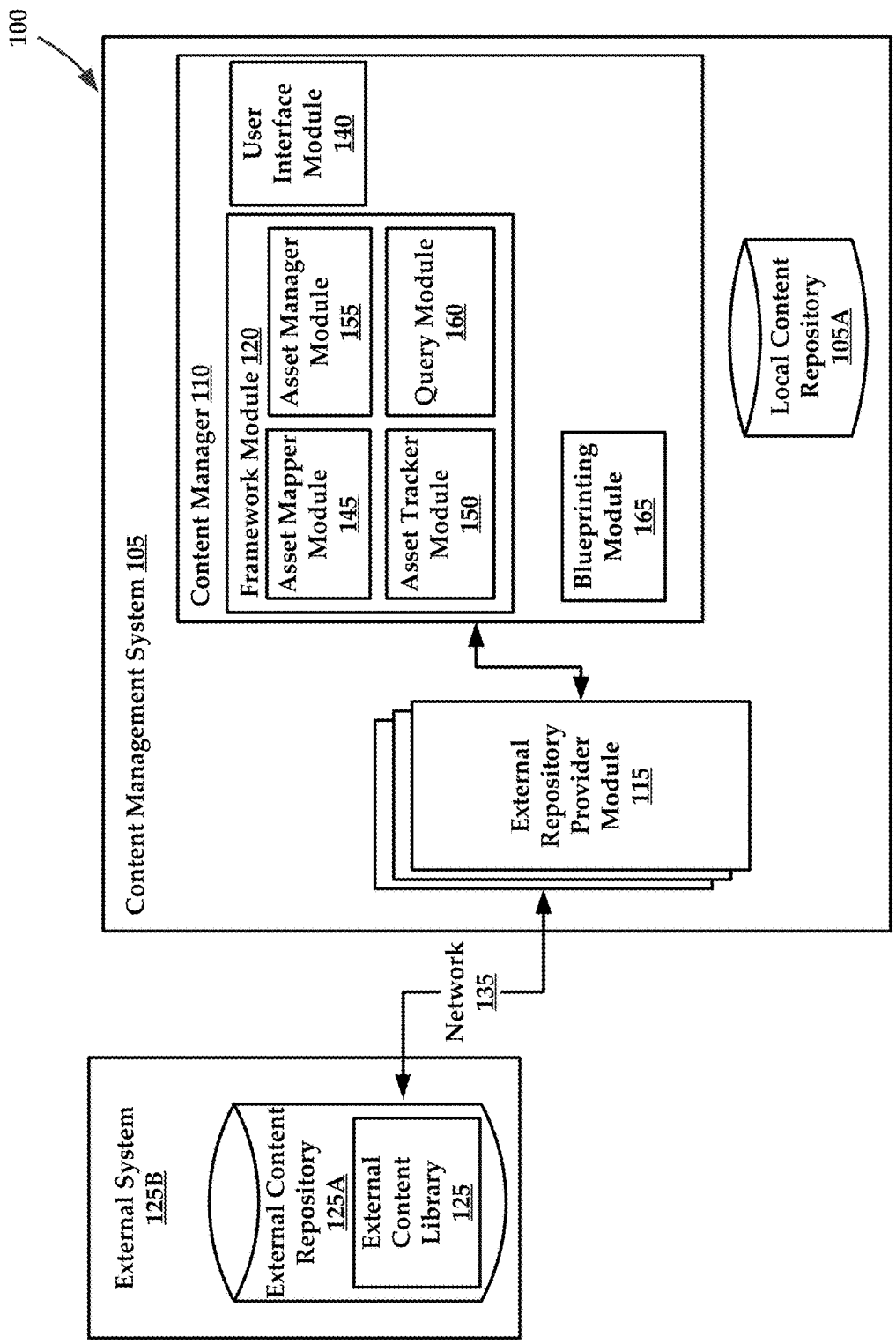
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed, in some embodiments, to web content management methods and systems that employ blueprinting to manage multi-faceted and/or multi-channel online marketing campaigns. The capabilities of the present technology provide a unique solution for multi-site management, especially when compounded with multi-faceted deployment requirements that may include localization, taxonomy, workflows, and geographic locales. Additionally, the present technology maintains relationships across multiple sites of an online marketing campaign, allowing for one-click updating, with site owners notified of asset changes while the content update (e.g., asset changes) is automatically inherited. The term inherited, as used throughout, may refer also to the "sharing" of content between publications, as well. That is, while the term inheriting connotes a parent-child relationship, the term sharing may be construed as being agnostic to vertical or horizontal relationships between publications. Nevertheless, inheriting may be understood to include both inheritance and sharing of assets between publications.

It will be understood that each publication (the highest-level directory structure) within a web marketing campaign can be configured as its own unique site or as a parent/child structure that can hide, inherit, localize and publish data. This architecture enables business communication professionals to effortlessly use shared resources across multiple websites, while retaining control over content that makes each site unique.

In operation, the present technology may be utilized to leverage and empower brand, management, multi-channel microsites, information architecture (IA) designs, taxonomy, search engine optimization (SEO)/search, campaigns, editorial workflows, and other web marketing activities that would be known to one of ordinary skill in the art. Additionally, the present technology addresses the multiplicity of web content management needs of current organizations that use a variety of platforms to publish content for the web, mobile, social media, and tablets—just to name a few.

The blueprints provided herein are flexible and can be adjusted over time to meet new business requirements using features such as personalization tags, permissions, roles, and architecture-based functions. These features enable organizations to take ownership of their blueprint by making changes and adjustments to their online marketing campaigns without having to redevelop the entire site strategy or templates and, in the end, cuts down significantly on development effort and timelines.

Additionally, these web content management systems may utilize external content libraries that reside on external content repositories. That is, the present technology may be utilized to virtually mount an external content library to a content management system that utilizes blueprints of the present technology.

These and other advantages of the present technology will be described in greater detail below with reference to the collective drawings (e.g., FIGS. 1-7).

FIG. 1 illustrates an exemplary architecture 100 for practicing aspects of the present technology. According to some embodiments, the exemplary architecture 100, hereinafter "architecture 100," may generally include a content management system, hereinafter "CMS 105." According to some embodiments, the CMS 105 may be configured to virtually mount an external content library such that assets stored in the external content library are accessible through the content management system similarly to local assets of a local content repository associated with the content management system.

Additionally, the CMS 105 may be configured to allow content authors to manage a web-based marketing campaign using a blueprint. In some embodiments, managing of a web-based marketing campaign may comprise the step of establishing a blueprint for a web-based marketing campaign using a content management system. It will be understood that the blueprint may comprise rules for managing assets utilized by at least a portion of a plurality of publications of a hierarchical model of the web-based marketing campaign. In some instances, the plurality of publications may comprise at least one parent publication and at least one child publication. Additionally, at least a portion of the assets utilized by the hierarchical model may be stored on an external content library.

According to some embodiments, the methods of the present technology may comprise a step of determining a change in at least one asset for the at least one parent publication, as well as a step of automatically sharing and/or inheriting the change in the at least one asset for the at least one parent publication to the at least one child publication, according to the blueprint.

It is noteworthy to mention that rather than a hierarchical model of publications, the blueprint may likewise be utilized with a semantic model of publications, which will be described in greater detail below.

According to various embodiments, the CMS 105 may be configured to use an external content library by registering an external content library with the CMS 105 using an external content provider module. Additionally, the CMS 105 may then map assets of the external content library for use within the CMS 105.

The CMS 105 is shown as comprising a content manager 110 that communicatively couples with one or more external content provider modules, such as external content provider module 115. The CMS 105 may also comprise a framework module 120 that governs the interactions between the content manager 110 and an external content library 125, via the external content provider module 115 (which is also referred to as the external repository provider module 115). Generally speaking, the CMS 105 may be configured to utilize one or more external content repositories, such as the external content library 125, as well as a local content repository 105A. The external content provider module 115 and the framework module 120 cooperate to provide end users with access to assets that reside on the external content library 125, as if the assets were stored locally on the local content repository 105A, as will be described in greater detail infra.

The external content library 125 may be stored in an external content repository 125A that resides on an external system 125B such as a web server or computing device that is positioned remotely from the CMS 105. It will be understood that the external content library 125 and the CMS 105 may preferably be owned by different entities. Additionally, individual assets on the external content library 125 may be associated or owned by different owners such that the external content library 125 includes assets for a plurality of owners. The external content library 125 and the CMS 105 may be communicatively coupled via a network 135. It is noteworthy to mention that the network 135 includes any one (or combination) of private or public communications networks such as the Internet. In some instances, an external content provider module 115 may communicatively couple with the external content repository 125A via an application programming interface (API). The API used by the external content provider module 115 may include a secure or insecure API.

In some instances, the CMS 105 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The content manager 110 of the CMS 105 may be utilized by content authors to design, create, and manage web contents such as web pages using various web development tools that would be known to one of ordinary skill in the art. Content authors may create web contents from scratch, or in some instance, utilize templates.

Figure 2A:
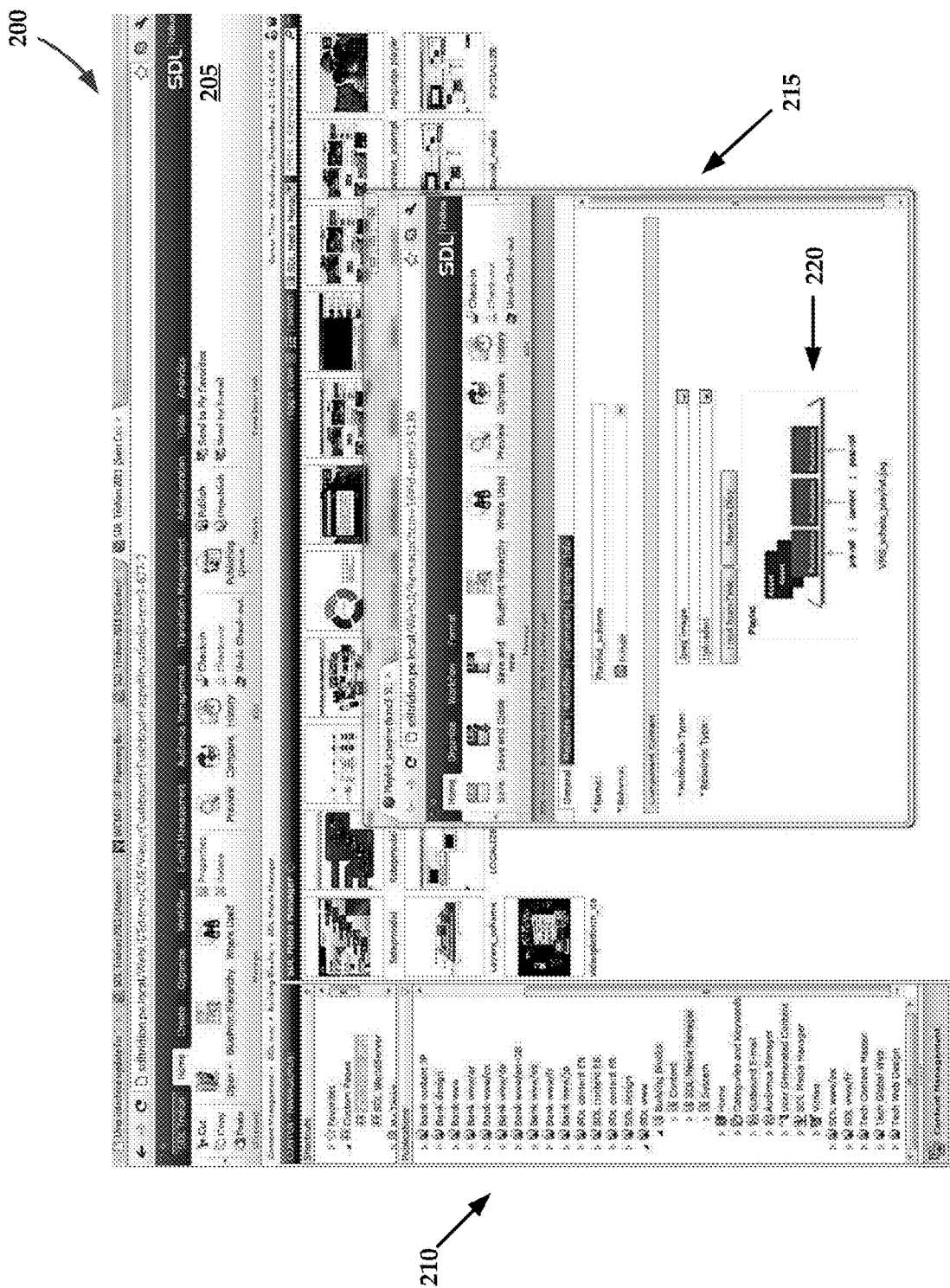
FIG. 2A is an exemplary graphical user interface in the form of an external content repository browser.
Figure 2B:
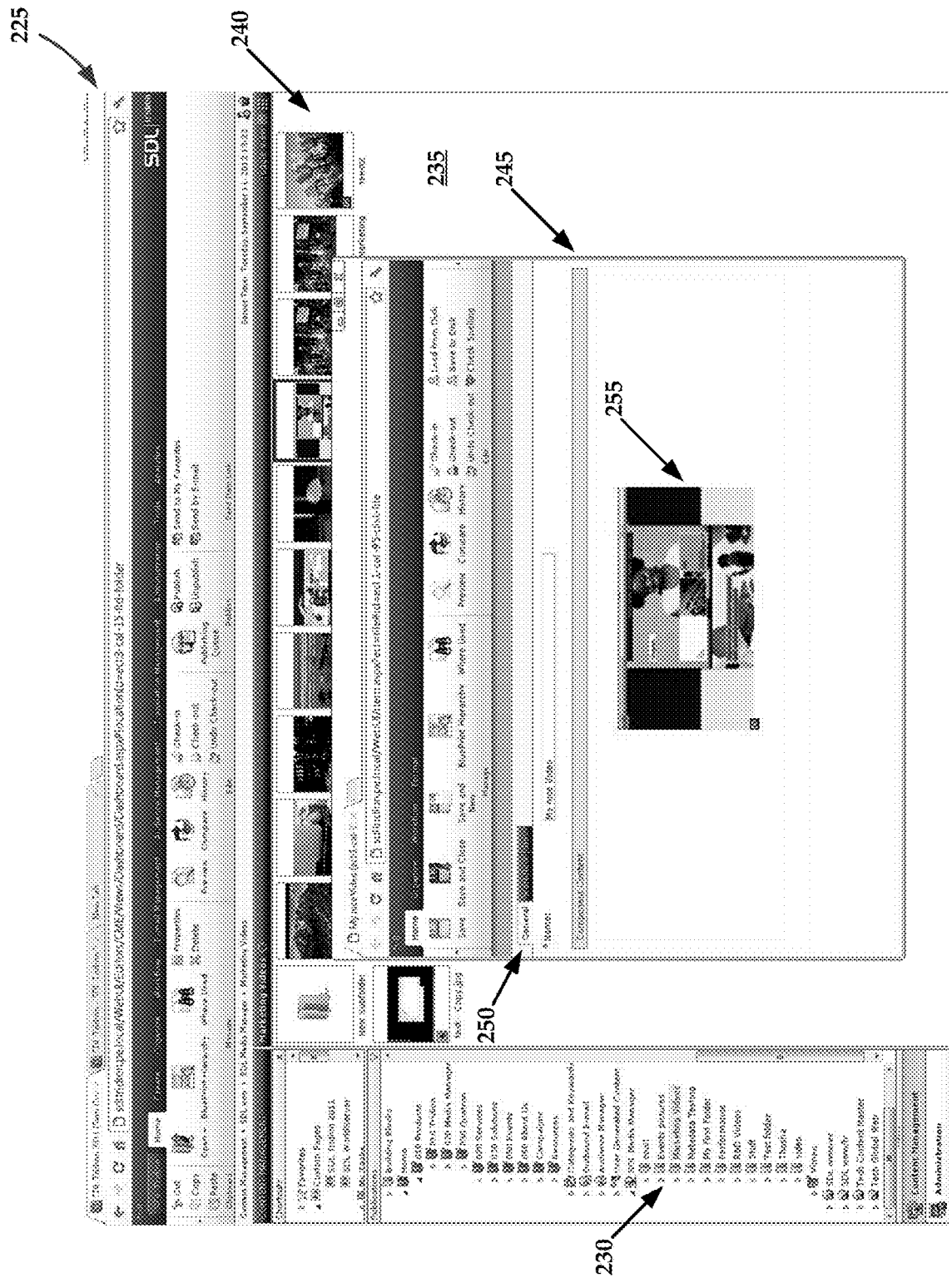
FIG. 2B is an exemplary graphical user interface in the form of a media manager provider interface.

In general, content authors may create web content using graphical user interfaces generated by a user interface module 140 of the content manager 110. An exemplary graphical user interface in the form of an external content repository browser window (e.g., Media Manager UI), generated by the user interface module 140 is illustrated in FIG. 2A. An exemplary graphical user interface in the form of a media manager provider interface, generated by the user interface module 140 is illustrated in FIG. 2B. Each of these graphical user interfaces will be described in greater detail infra.

As mentioned before, the CMS 105 may include one or more external content provider modules, such as the external content provider module 115 that each registers with an individual external content library. In some instances, a single external content provider module may register with more than one external content library, and further, the single external content provider module may register with multiple external content libraries of differing domains (e.g., classes).

The external content provider module 115 may register the external content library 125 using an API. The API may utilize either secure or insecure data transmission methods for exchanging data between the external content provider module 115 and the content manager 110. In some instances, content authors or system administrators may configure settings that are utilized by the external content provider module 115 for exchanging data between the external content provider module 115 and the content manager 110. For example, a system administrator may establish end point configuration settings for exchanging data between the external content library and the external content provider.

In various embodiments, registering the external content library 125 with the external content provider module 115 may comprise establishing a transport level security configuration between the external content library 125 and the external content provider module 115. According to some embodiments, configuration settings may comprise the establishment of a trust relationship for end-user asset provisioning. For example, content authors may be required to present and/or verify their identity before accessing assets that reside on an external content repository.

Once the external content library 125 has been registered with the CMS 105 via the external content provider module 115, the framework module 120 may be executed to map at least a portion of the content (e.g., assets) that resides on the external content repository.

Generally speaking, the framework module 120 may comprise an asset mapper module 145, an asset tracker module 150, an asset manager module 155, and a query module 160. It is noteworthy that the framework module 120 may include additional or fewer modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the framework module 120 may include separately configured web servers.

The asset mapper module 145 may be configured to map the assets that reside on the external content library 125 to the content manager 110 such that the contents of the external content library 125 are made available to the content manager 110 similarly to content or assets stored locally on a local content repository of the CMS 105.

Mapping of the assets may include identifying assets included in one or more external content libraries that reside within file systems or file structures (e.g., folders, subfolders, drives, etc.) of the external content repository 125A. Once the assets have been identified, the asset mapper module 145 to determine particular types of information regarding each type of asset. For example, the asset mapper module 145 may be configured to determine a file name, file type, file size, file version, and/or any other types of file information that would be known to one of ordinary skill in the art. Various combinations of these types of information may also be gathered. Additionally, the asset mapper module 145 may obtain or generate a thumbnail image of each asset that is mapped, if available.

Once the assets of the external content library 125 have been mapped by the asset mapper module 145, the assets are made available to the content manager 110 as if the assets were stored locally on the local content repository 105A. For example, when a content author is creating web content and the content author queries the content manager 110 for available assets, mapped assets that are stored on the external content library 125 are returned in the search results, along with any local assets that reside on the local content repository 105A.

For example, a content author may query the content manager 110 for image file assets that are associated with a particular keyword or keywords. The content manager 110 may utilize mapped asset indices created from asset mappings determined by the asset mapper module 145. These asset mappings may be of assets located on an external content library 125 or assets that are stored locally on the local content repository 105A. The content manager 110 may return a query response that includes representations of assets that match the query, which reside on either the external or local content libraries. It will be understood that the asset mapper module 145 may map the assets of the external content library 125 onto the content manager 110 using other features than indices, such as tables, graphs, lists, and so forth.

Additionally, the mapped assets of the external content library 125 may be viewed by a content author via the content manager 110 by way of a graphical user interface generated by the user interface module 140. FIG. 2A illustrates an exemplary user interface in the form of an external content repository browser window 200. This browser window 200 may resemble an explorer window that would be generated by an operating system, a browser window generated by a web browser application, or any other suitable interface that would allow the end user to browse the contents of a file structure, such as a folder. The browser window 200 may comprise a web content ribbon 205 that allows a content author to manage web content using a plurality of features. Again, these features may comprise blueprinting features, publishing features, web content editing features, as well as other features that would be known to one of ordinary skill in the art.

The browser window 200 may also comprise a content management pane 210 that provides views of various publications (e.g., web content) and their constituent assets in a hierarchical format. The browser window 200 may also comprise an asset pane that includes a plurality of assets. These assets have been mapped to the content manager 110 such that the assets may be displayed to the content author. In this example, thumbnail images of assets of an external content library are displayed to the content author. A Media Manager UI 215 may be utilized to define a playlist scheme that defines the use of an exemplary asset such as an image file. The content author may specify the media type and resource type for the image asset from dropdown lists. The UI 215 may also comprise a graphical representation of a hierarchy of assets of a playlist for use within a publication (e.g., pre-roll, content, post-roll). In some embodiments, right clicking or hovering over an asset in the browser window 200 may cause the user interface module 140 to display information regarding the asset such as a file name, file size, and so forth. Again, these file attributes were determined during mapping of the assets by the asset mapper module 145.

FIG. 2B is an exemplary graphical user interface in the form of a media manager provider interface 225. The interface 225 may comprise a folder tree that includes assets mapped to local and/or external content. In this example, a marketing videos folder 230 has been selected. A media pane 235 is then populated with assets 240 included in the videos folder 230. An component content window 245 comprises a visual representation of an asset "My nice Video" as well as Tabs 250 that include a General Tab with basic descriptive information for an asset 255, an Info tab that includes further information for the asset, and a Workflow tab that includes implementational details for using the asset in a publication.

After browsing for assets on the external content repository, the content author may select an asset from the external content library for use in the creation of web content, such as a web page. The selection and inclusion of the asset causes the asset mapper module 145 to perform a second type of mapping. More specifically, the second type of mapping executed by the asset mapper module 145 may link a selected asset to web content being created by the content author. That is, the framework module 120 of the content manager 110 may utilize the asset mapper module 145 to manage links between, for example, a web page created by the content author, and an asset located on an external content repository that has been selected for inclusion into the web page. Thus, when the web page is published, the linked asset may be obtained from the external content repository when the web page is requested.

The asset mapper module 145 may also advantageously track the mapping between the asset on the external content library 125 and the content manager 110 such that changes to the asset are identified and updated in the content manager 110 to reduce the likelihood that changes in the asset will result in errors in retrieving the content at a later date. Therefore, the asset mapper module 145 may continuously or periodically evaluate the assets of the external content library 125 to identify changes in assets.

For example, if the owner of the asset on the external content library 125 changes the location of asset from one file folder to another file folder, the asset mapper module 145 may recognize this change and update the mapping between the asset and the web content to reflect this change. In sum, the mapping of assets by the asset mapper module 145 may not be only a static or singular event that occurs when the external content library 125 is initially registered, but may occur at regular or sporadic intervals to ensure that assets are available and properly linked to web content, as required.

As mentioned briefly above, the asset mapper module 145 may utilize a built-in Security Token Services (STS) to establish a secure trusted connection between CMS 105 and one or more external content repositories. In other instances, the asset mapper module 145 may utilize an external STS such as Active Directory Federation Services™ Windows Azure Active Directory™/Access Control Service (WAAD/ACS), Tivoli Access Manager™, Ping Identity™, or other external STS that would be known to one of ordinary skill in the art.

As assets residing on mapped external content libraries are utilized, the asset tracker module 150 may be executed to track the usage of such assets. For example, the asset tracker module 150 may identify when an asset has been included in a publication. The asset tracker module 150 may also identify when the asset has been requested by a publishing server, such as the web server that is utilized to publish the web content that includes the selected assets. Other similar metrics regarding the incorporation of assets within web content and/or actual usage (e.g., requests) of assets relative to their provisioning via delivery of the web content.

The asset tracker module 150 may provide usage information for an asset of the external content library utilized through the content management system to an owner of the asset. In some instances, the owner of the asset may be compensated for the inclusion of the asset within a web page or other web content. The tracking of asset usage by the asset tracker module 150 may provide a unique mechanism for compensating the owners of assets that reside on external content repositories. Advantageously, content authors may utilize assets that are external to the CMS 105 without being obligated to obtain the entire external content library. Additionally, the ability of the present technology to map and make available assets that are external to the CMS 105 allows for extending a corpus of assets that are available to the content library of the CMS 105 without obligating the system administrators of the CMS 105 to store assets locally, which increases the operating expenses for the CMS 105.

In sum, the ability of the present technology to register and map external content libraries to a local CMS 105 effectively creates a distributed and robust collection of assets for the CMS 105 that reduces the administrative cost and burden of maintaining a comprehensive content library.

According to some embodiments, the content manager 110 may be configured to allow content authors to modify assets stored on external content repositories by execution of an asset manager module 155. In some instances, proper authorization may be required from the owner of the assets of an external content library before a modification to an asset may be allowed. For example, the asset owner may be required to select various permissions for an asset, such as read, write, delete, and so forth.

Generally, content authors may also be allowed to delete and/or upload assets to the external content library 125, with these changes being identified by the asset mapper module 145 to ensure that mappings remain valid.

In some embodiments, the asset manager module 155 may be utilized to evaluate versions of an asset of the external content library 125. The asset mapper module 145 may cooperate with the asset manager module 155 to track and map the usage of the various versions of an asset of the external content library 125.

One of the many advantages of the mapping of external assets for use in a local CMS 105 is that when a content author queries the content manager 110 of the CMS 105 for assets, the content manager 110 may provide results that include assets from local content repositories, as well as external content libraries. Thus, as the content author builds their web content and queries for content that the content author desires to utilize in their web content, the content author may view assets on external content libraries as if they resided locally on a local content repository.

Thus, the query module 160 may be executed to receiving a content query via the content manager 110. The query module 160 may search a local content repository associated with the content management system and the external content library using the content query, and return results in response to the content query. Again, the registering and mapping of assets on external content repositories to the CMS 105 results in the assets of the external content libraries being made available as if they were stored locally on a local content repository of the CMS 105.

In accordance with the present disclosure, if a content author desires to effective manage a plurality of publications of a web marketing campaign, the content author may establish a blueprint for the web marketing campaign. Thus, the blueprinting module 165 of the content manager 110 may be executed to establish a blueprint for the web marketing campaign.

In general, publications for a web marketing campaign may be arranged into either a hierarchical model of publications or a semantic model of publications. The content manager 110 may execute the user interface module 140 to generate various user interfaces that allow the content author to create a blueprint. For example, the content author may establish relationships between publications, such as parent/child.

Additionally, the content author may establish rules for inheriting changes in assets based upon these established relationships. For example, the content author may establish a rule that requires all logo images to be inherited from the parent in an unmodified format to ensure that the logo/branding associated with the publication is consistent. A rule may be established that all tradename, trademark, servicemark, logo, brand, or other source identifiers be consistently used (e.g., inherited in an unmodified manner). The content author may also establish an exemplary rule such as localization requirements for a child publication. For example, the content author may establish rules for a child publication that is to be published to French readers that requires all text assets to be translated into French.

According to some embodiments, external content stored on the external content library 125 may be appended with metadata by the content manager 110. Metadata for the assets of a publication may be inherited according to the blueprint associated with the publication. In some instances the metadata may be localized to reflect the specific attributes of assets associated with a child publication. For example, if an asset such as a video file or an image file includes an alternative text asset, this alternative text may be shown on a website (e.g., child publication). It will be understood that the text for the asset may be localized to a language of that specific regional website. Thus, the alternative text for the asset may vary upon the localization rules included in the blueprint. If the blueprint includes three localized child publications for three countries such as the U.K., Mexico, and France, the alternative text for the same asset in each of these child publications may specify English text for the U.K. child publication, Spanish text for the Mexico child publication, and French text for the French child publication.

Figure 3A:
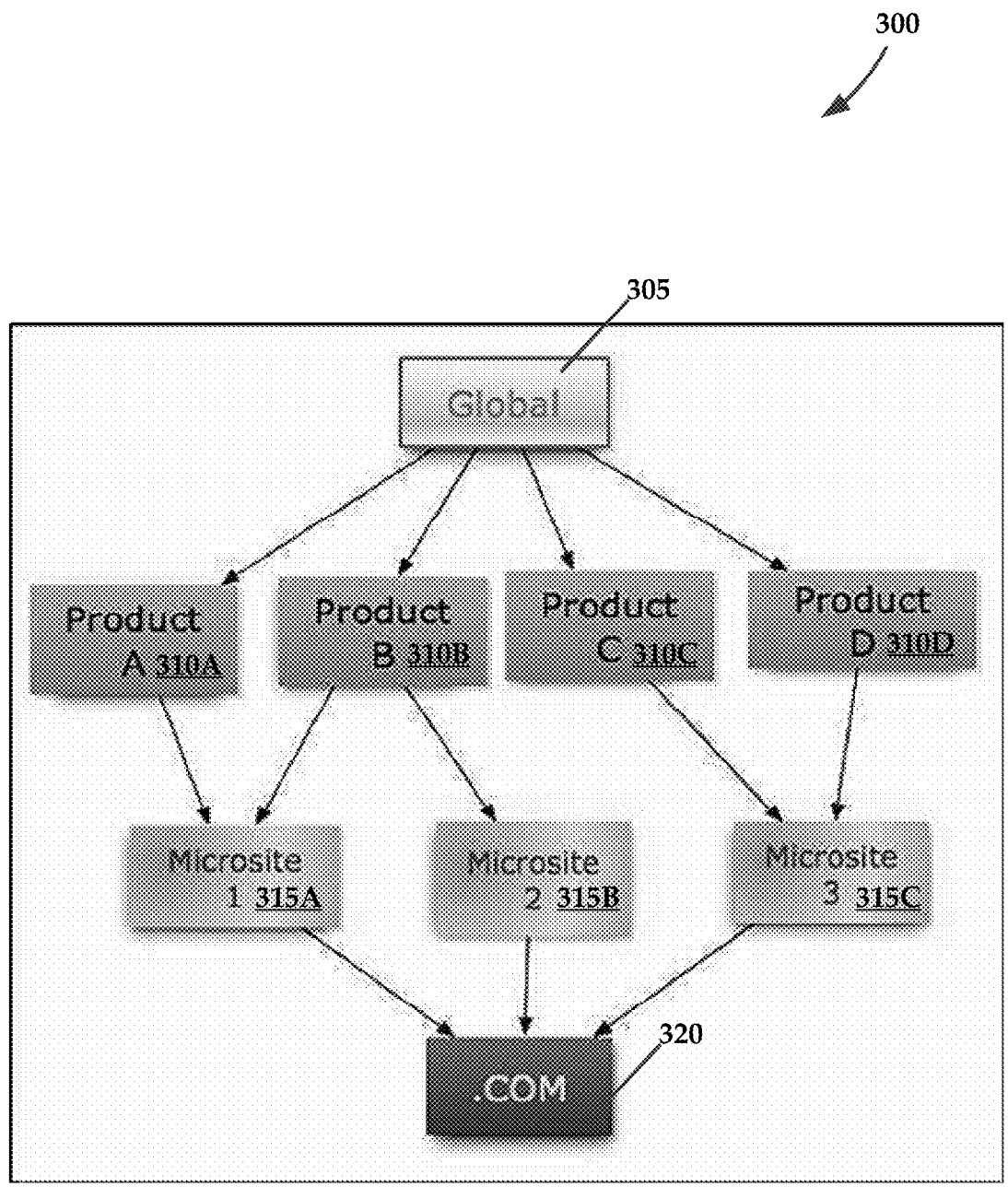
FIG. 3A illustrates an exemplary hierarchical model of publications.

FIG. 3A illustrates an exemplary hierarchical model 300 of publications. The hierarchical model 300 is shown as comprising global content (e.g., assets) 305, a plurality of products 310A-D, which may inherit assets from the global content 305, and a plurality of microsites 315A-C, which may inherit assets from one or more of the plurality of products 310A-D. The global content 305 may include assets of external content libraries that reside on external content repositories. The hierarchical model 300 is shown as also comprising a ".com" website 320, which may inherit assets from any of the microsites 315A-C.

Linkages or relationships between publications (e.g., microsites, products, websites, etc.) may be included in the blueprint. The blueprint comprises rules for managing assets utilized by each of the publications in the hierarchical model 300. These linkages are shown as arrows extending between publications. For example, product 310A and product 310B may be linked to microsite 315A such that changes in assets to either product 310A and/or product 310B may inherit down to microsite 315A.

It is noteworthy to mention that in a hierarchical model, changes in assets for a child publication (e.g., a publication that is vertically disposed below another publication in the hierarchy), such as with the localization of an asset, may not result in automatic inheritance of those changes vertically to a parent publication. For example, changes in an asset of the microsite 315A may not cause a corresponding change in the same asset on the product 310A or product 310B. Additionally, this change at the child level may break the linkage between the child publication and the parent publication, at least with respect to the asset.

Figure 3B:
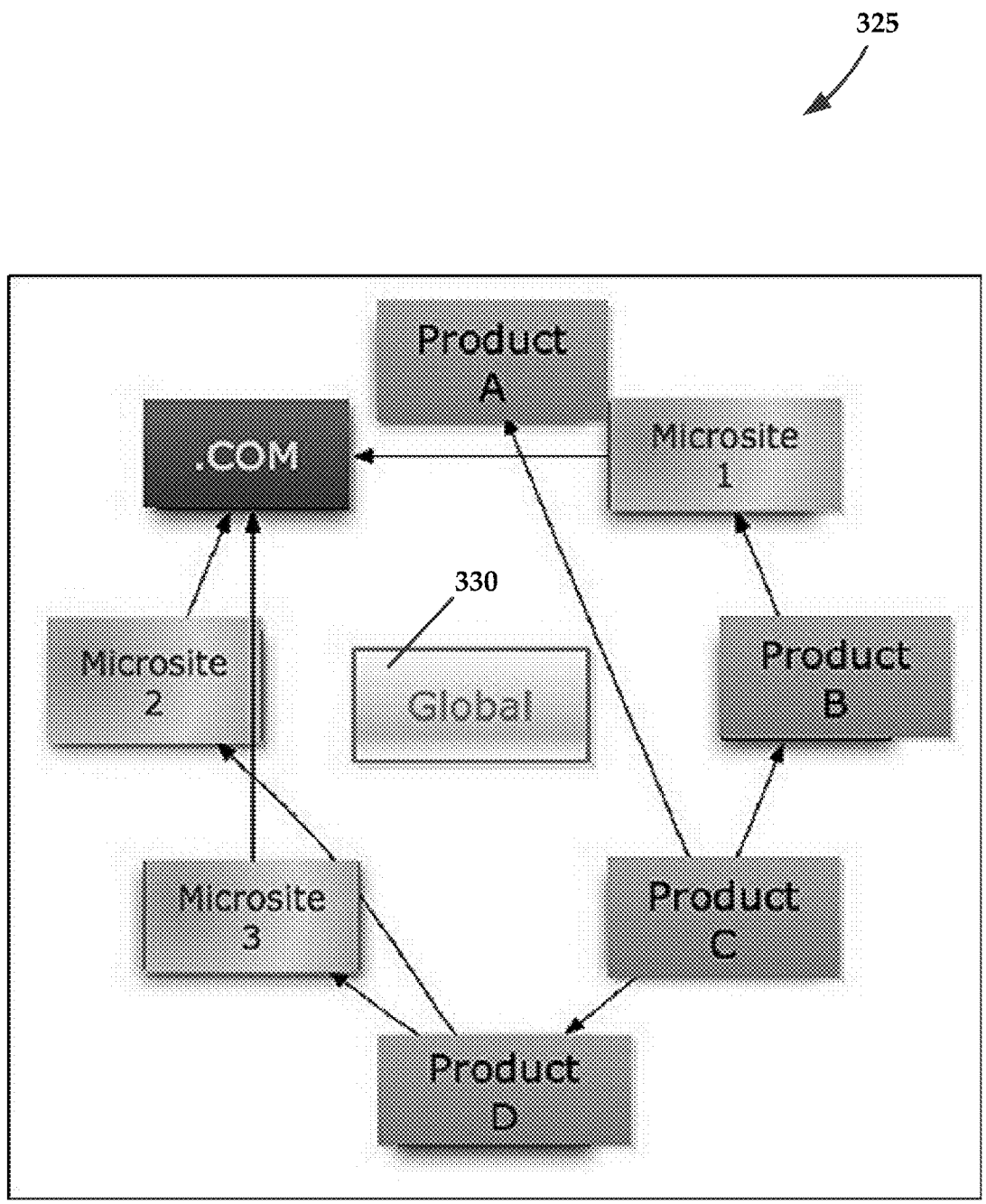
FIG. 3B illustrates an exemplary semantic model of publications.

FIG. 3B illustrates an exemplary semantic model 325 of publications. The semantic model 325 may include global content 330, which includes assets that are to be utilized in the web marketing campaign. In contrast with the global content of the hierarchical model of FIG. 3A, the global content 330 is conceptually the locus/corpus of assets for a plurality of publications. Rather than having to inherit assets from a parent publication, each publication may receive assets directly from the global content 330. Again, the global content 330 may include assets of external content libraries that reside on external content repositories. Thus, the semantic model allows for multiple inheritance features for child publications.

Thus, various product publications, microsites, and websites may be interrelated with one another using a semantic model such that the global content 330 is central to the model.

Additionally, a publication in the semantic model 325 can have parent/child relationships with other publications within the system. Advantageously, a publication in a semantic model can be both a parent and a child, which allows sharing of assets both from and to other publications. A child publication can have multiple parents, and when this occurs a prioritization (e.g., priority rules) can be established that determine which parent has first priority for sharing assets with the dependent publication. Changes made in the parent publication may affect all, or a portion, of the child publications. However, changes made at the child level may or may not affect the parent publication(s).

Figure 4:
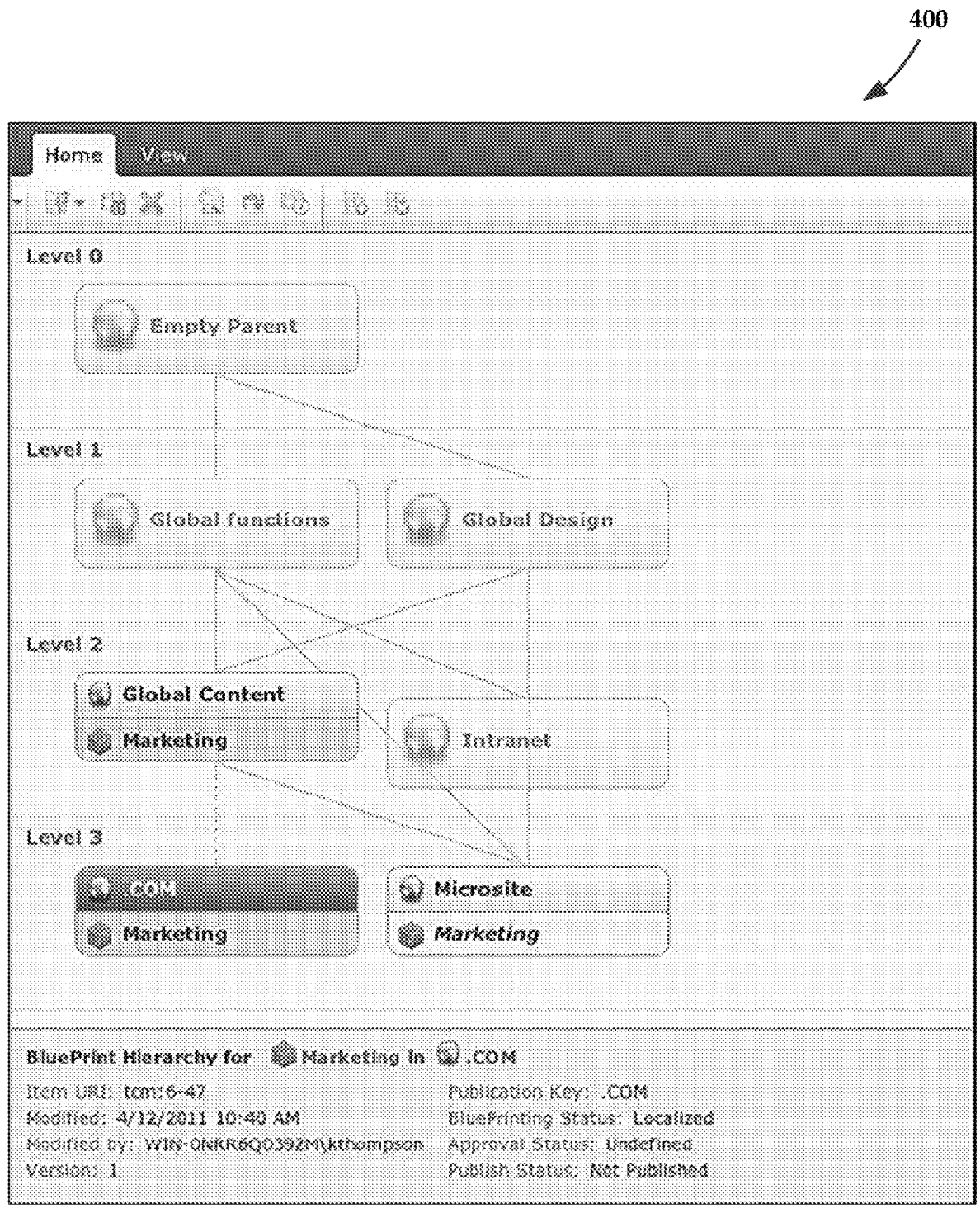
FIG. 4 is an exemplary user interface in the form of a hierarchical model map.

FIG. 4 is an exemplary user interface in the form of a hierarchical model map 400. The map 400 represents an exemplary use case where a hierarchical model has been utilized to establish relationships between various publications. In this example, marketing content has been localized in .COM at Level 3. Because marketing content was created at Level 2 in the global content publication, it has also been shared with the microsite publication however it is not localized but directly inherited with the microsite. This map 400 also demonstrates how content can be inherited, localized and shared within a hierarchical model. This map 400 may be made available for content authors who have permission to view the marketing content, allowing for a quick view of where assets are coming from, where the assets have been inherited and localized, and the identity of the content author who created the asset.

According to some embodiments, a blueprint model may be combined with taxonomies for assets, allowing content authors to publish "smart" content for their customers. Categories and keywords within the taxonomy model follow the blueprint model rules, giving business organizations flexibility when defining asset related tagging guidelines based on the needs of their clients—whether the need be cultural, language, and/or product availability.

Figure 5:
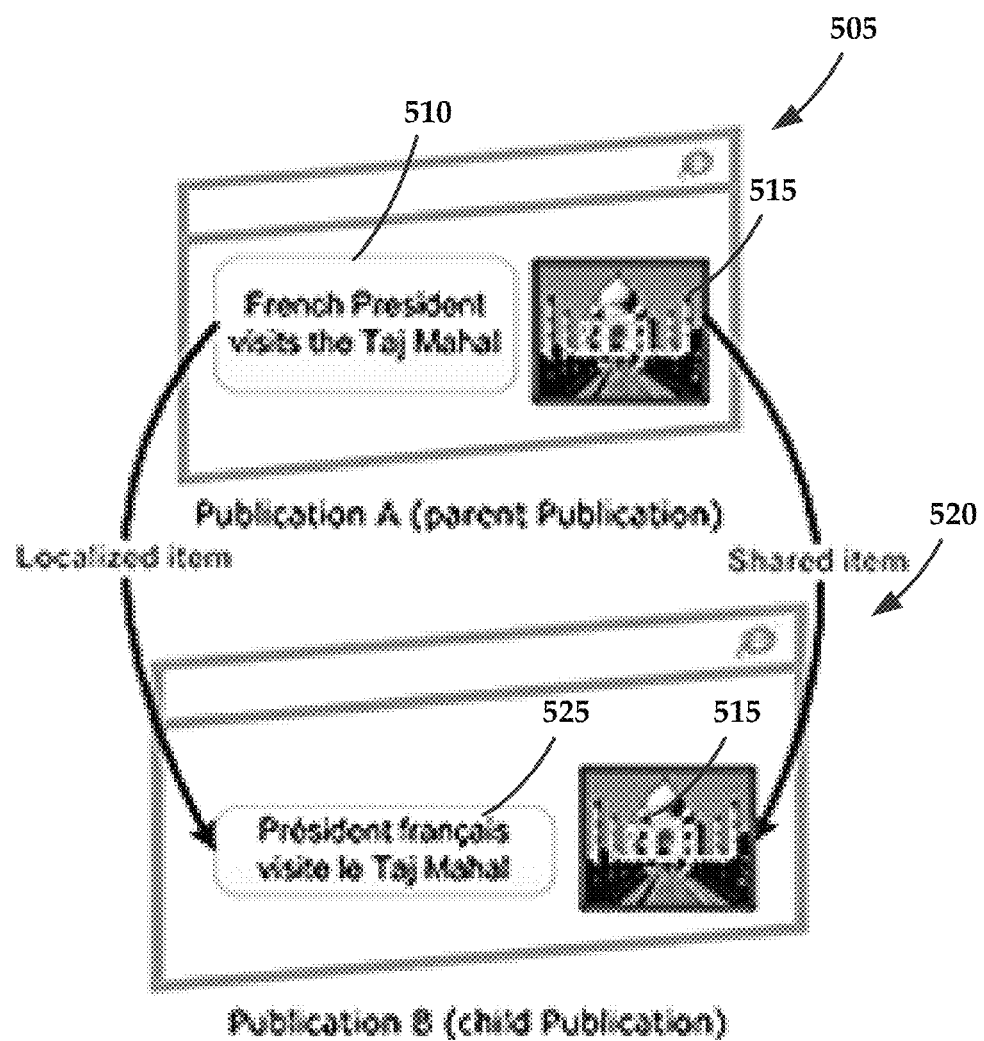
FIG. 5 illustrates inheritance and localization of assets between parent and child publications within a hierarchical model of publications, using a blueprint.

FIG. 5 illustrates inheritance and localization of assets between parent and child publications within a hierarchical model of publications, using a blueprint. A parent publication 505, shown here as a web page that includes a text asset 510 and a media asset (also referred to as an image asset) 515. Based upon rules contained in the blueprint, a child publication 520 is shown as inheriting the same image asset 515, while the text asset has been localized by translating the text asset from English into French to produce a localized text asset 525.

Rather than translating the child publication 520 manually, the blueprint may instruct the content manager 110 to automatically localize the text asset. Thus, when the text asset 510 of the parent publication 505 is modified, the content manager 110 may utilize the blueprint to determine that an automatic translation of the updated text asset is required for localization.

According to some embodiments, the image asset 515 may be an asset that is stored in an external content library 125. Thus, the blueprint that governs the parent and child publications 505 and 520, may also include mappings of the image asset that is stored in the external content library to both the parent publication 505 and the child publication 520. As mentioned above, the mapping of assets for a publication (e.g., web content) may be determined by the asset mapper module 145 (see FIG. 1).

It will be understood that the rules for managing the relationship between the parent publication 505 and the child publication 520 may require that text content be localized by translation into French, while image assets are inherited. While this example is rudimentary, it is descriptive of the effects of a blueprint relative to how assets are shared between publications in a hierarchical or semantic model. In other examples, the rules for the blueprint may require translation any time a publication is intended to be provisioned to an audience that speaks a different language from the language used to create the parent publication. Other rules may comprise changing the color, layout, or other aesthetic portions of a child publication. Again, the rules included in the blueprint may be used to ensure that child publications are culturally, linguistically, contextually, or otherwise relevant to their intended audience.

Once a blueprint has been established for a web marketing campaign, changes in an asset in a publication may be automatically shared and/or inherited to dependent (e.g. child or laterally related) publications according to the blueprint by executing the blueprinting module 165. The automatic inheritance of asset changes using the blueprint via the blueprinting module 165 may enhance the effectiveness of the web marketing campaign by ensuring that branding, assets, and other content included in publications are consistently maintained across the publications of a web marketing campaign without requiring manual updating of each publication.

Figure 6:
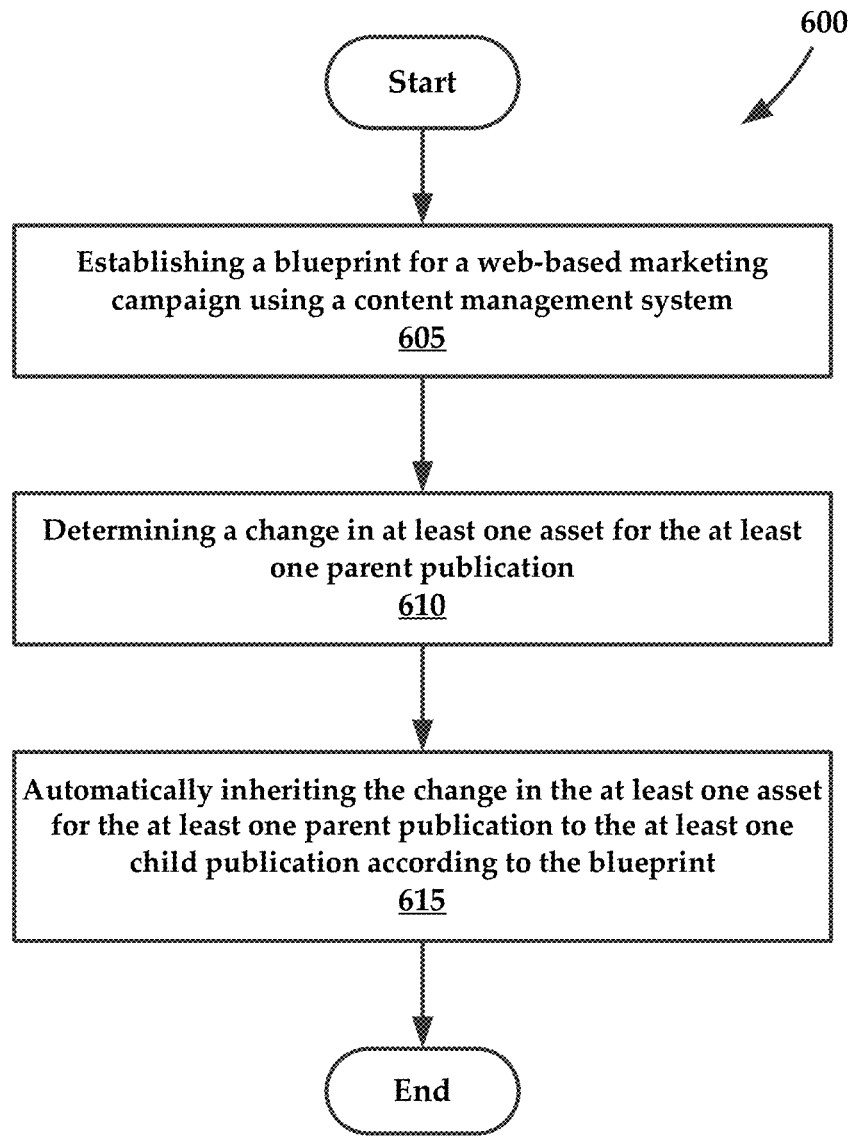
FIG. 6 is a flowchart of an exemplary method for managing a web-based marketing campaign using a blueprint.

FIG. 6 is a flowchart of an exemplary method 600 for managing a web-based marketing campaign using a blueprint. The method 600 may comprise a step 605 of establishing a blueprint for a web-based marketing campaign using a content management system. According to some embodiments, the blueprint may comprise rules for managing assets utilized by at least a portion of a plurality of publications of a hierarchical model of the web-based marketing campaign. It will be understood that the plurality of publications may comprise at least one parent publication and at least one child publication. Additionally, at least a portion of the assets utilized by the hierarchical model may be stored on an external content library.

In some embodiments, the method 600 may comprise a step 610 of determining a change in at least one asset for the at least one parent publication. Once a change in at least one asset has been determined, the method may then comprise a step 615 of automatically sharing and/or inheriting the change in the at least one asset for the at least one parent publication to the at least one child publication according to the blueprint.

Figure 7:
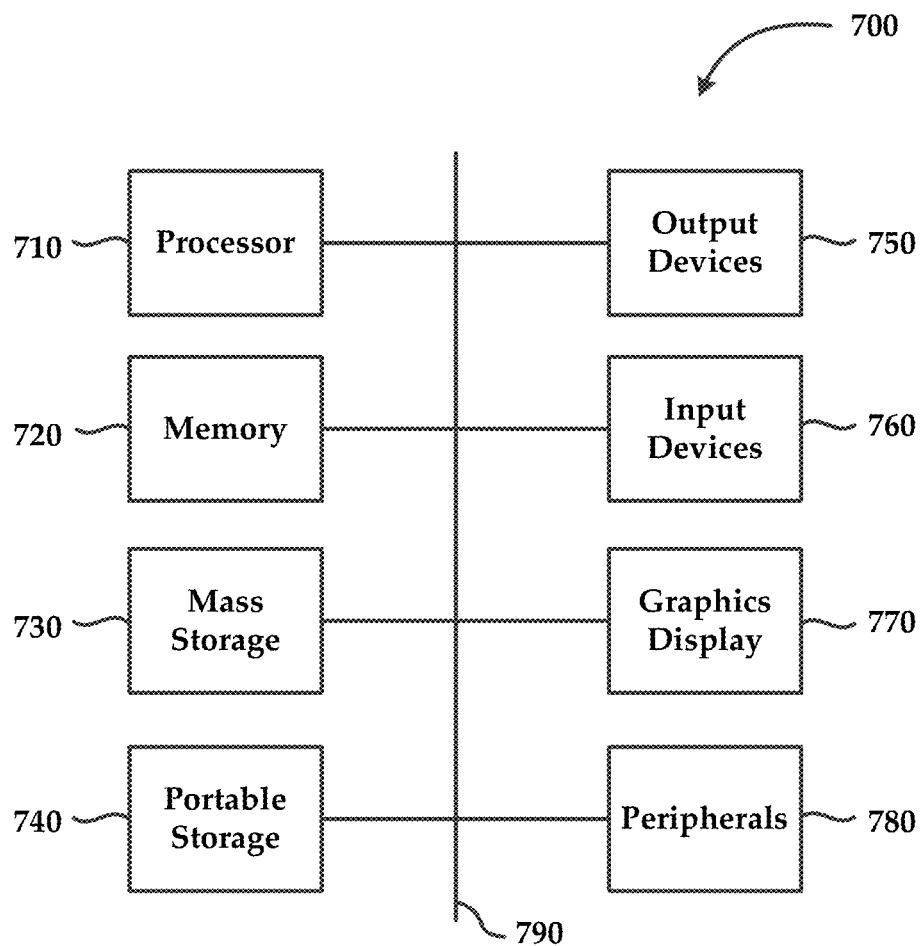
FIG. 7 is a block diagram of an exemplary computing system for implementing embodiments of the present technology.

FIG. 7 illustrates an exemplary computing system 700 that may be used to implement an embodiment of the present technology. The computing system 700 of FIG. 7 may be implemented in the contexts of the likes of computing systems, networks, exchanges, servers, or combinations thereof disclosed herein. The computing system 700 of FIG. 7 includes one or more processors 710 and main memory 720. Main memory 720 stores, in part, instructions and data for execution by processor 710. Main memory 720 may store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. The components may be connected through one or more data transport means. Processor unit 710 and main memory 720 may be connected via a local microprocessor bus, and the mass storage device 730, peripheral device(s) 780, portable storage device 740, and graphics display 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 may store the system software for implementing embodiments of the present technology for purposes of loading that software into main memory 720.

Portable storage device 740 operates in conjunction with a portable non-volatile storage medium, such as a floppy disk, compact disk, digital video disc, or USB storage device, to input and output data and code to and from the computing system 700 of FIG. 7. The system software for implementing embodiments of the present technology may be stored on such a portable medium and input to the computing system 700 via the portable storage device 740.

Input devices 760 provide a portion of a user interface. Input devices 760 may include an alphanumeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Suitable output devices include speakers, printers, network interfaces, and monitors.

Graphics display 770 may include a liquid crystal display (LCD) or other suitable display device. Graphics display 770 receives textual and graphical information, and processes the information for output to the display device.

Peripherals devices 780 may include any type of computer support device to add additional functionality to the computing system. Peripheral device(s) 780 may include a modem or a router.

The components provided in the computing system 700 of FIG. 7 are those typically found in computing systems that may be suitable for use with embodiments of the present technology and are intended to represent a broad category of such computer components that are well known in the art. Thus, the computing system 700 of FIG. 7 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for managing a plurality of web-based and non-web publications using a blueprint, the method comprising:
    establishing a blueprint for a plurality of web-based publications and non-web publications using a content management system,
        the blueprint comprising rules for managing linkages of a plurality of assets between a plurality of publications of a hierarchical model of publications, the plurality of assets utilized by at least a portion of the publications,
        the plurality of publications comprising at least one parent publication and at least one child publication treated as a parent/child structure that can hide, inherit, localize and publish data,
        the blueprint rules further comprising rules for localizing assets including
            rules for whether to automatically translate changes in the assets for the at least one child publication without manual translation,
            rules for determining based on a type of the assets whether to inherit the changes in the assets in an unmodified format, including without translation of the asset changes, between the parent and the at least one child publications, and
            rules for determining based on content of the assets whether to inherit the changes in the assets in an unmodified manner, including without translation of the asset changes, between the parent and child publications,
    at least a portion of the plurality of assets utilized by the hierarchical model being stored on an external content library mapped to the content management system via a network, the assets on the external content library owned by a plurality of different owners, wherein the external content library is registered and mapped by:
        registering the external content library with the content management system using an external content provider module, whereby one or more content authors must present or verify their identity before accessing assets that reside on the external content library; and
        mapping assets of the external content library for use within the content management system; and
    at least a portion of the plurality of assets utilized by the hierarchical model being stored locally on the content management system on a local content repository;

periodically evaluating the assets of the external content library to detect a change in at least one asset of the plurality of assets stored on the external content library for the at least one parent publication;

using the blueprint rules for the linkages and localizing assets to determine whether to automatically translate at least a portion of the change in the at least one asset across multiple websites for the at least one parent publication to the at least one child publication without translating manually; and using the blueprint rules for the linkages and localizing assets to determine whether to automatically inherit at least an unmodified portion of the change including without translation of the portion of the change, in the at least one asset across multiple websites for the at least one parent publication to the at least one child publication.

2. The method according to claim 1, wherein the external content library is registered and mapped to the content management system.

3. The method according to claim 2, wherein the mapping of the assets of the external content library for use within the content management system by an asset mapper module occurs at intervals to ensure that the assets are available and properly linked to web content.

4. The method according to claim 1, wherein localizing comprises any of translation, hiding, inheriting, pushing, or any combinations thereof, of assets for a publication.

5. The method according to claim 1, wherein a publication comprises any of assets, templates, functionalities, keywords, metadata, workflows, or any combinations thereof.

6. The method according to claim 1, further comprising, upon selection of an asset from the external content library via the content management system, mapping the selected asset from the external content library into web content being created on the content management system.

7. The method according to claim 1, wherein a blueprint rule for automatically localizing a change in a video asset that includes text metadata to reflect specific attributes of the asset associated with the at least one child publication comprises:

automatically inheriting images of the video without modification, automatically inheriting at least a portion of changes to the text metadata without translating the inherited portions of the changes to the text metadata, and automatically translating at least a portion of text metadata of the metadata not automatically inherited into a language of the at least one child publication without manual translation.

8. The method according to claim 1, wherein the external content library includes assets for a plurality of owners and individual assets on the external content library are owned by different owners.

9. The method according to claim 1, further comprising tracking usage of assets stored on the external content library and providing usage information for the assets to respective owners of the assets.

10. The method according to claim 1, wherein the blueprint rules further comprise rules for localizing text in the at least one asset to that of a language of one of the multiple websites.

11. The method according to claim 1, wherein the blueprint rules further comprises rules for localizing a text asset of the at least one asset by translating the text asset from a first language to a second language, to produce a localized text asset in one of the multiple websites.

12. The method according to claim 1, wherein the non-web publications are for mobile, social media, and tablet platforms.

13. The method according to claim 1, wherein when a content author selects an asset from the external content library for inclusion in a creation of web content via a graphical user interface, a second mapping is executed by linking the selected asset to the web content being created by the content author.

14. A method for managing a web-based and non-web based marketing campaign using a blueprint, the method comprising:

establishing a blueprint for a web-based marketing campaign using a content management system, the blueprint comprising rules for managing linkages for video assets between a plurality of publications of a semantic model of the web-based and non-web based marketing campaign the video assets including text metadata shown by at least a portion of the plurality of publications, the blueprint further comprising additional rules for when to inherit at least a portion of changes in the video assets and when to automatically translate at least a portion of the changes in the video assets for each of the plurality of publications, at least a portion of the video assets being stored on an external content library and mapped to the content management system via a network, wherein the external content library is registered and mapped by:

registering the external content library with the content management system using an external content provider module, whereby one or more content authors must present or verify their identity before accessing assets that reside on the external content library; and mapping assets of the external content library for use within the content management system;

continually evaluating the assets of the external content library to detect a change in at least one asset for at least one of the plurality of publications; and using the blueprint rules for the linkages and localizing assets to determine:

when to automatically translate without manual translation at least a portion of the change in the text metadata of at least one video asset across multiple websites for at least one parent publication to at least one child publication, when to automatically inherit in an unmodified format, including without translation at least a portion of the change in the text metadata of the at least one video asset for the at least one of the plurality of publications to a dependent publication, and when to automatically translate at least a portion of the text metadata not automatically inherited into a language of the at least one child publication without manual translation.

15. The method according to claim 14, wherein the external content library is virtually mounted to the content management system such that assets located on the external content library are accessible through the content management system similarly to local assets of a local content repository associated with the content management system.

16. The method according to claim 14, wherein the semantic model comprises a plurality of parent publications and a plurality of dependent publications.

17. The method according to claim 16, wherein when a dependent publication has two or more parent publications, the rules for managing assets included in the blueprint comprise a priority for each parent publication that determines an order for asset inheritance from between the two or more parent publications to the dependent publication.

18. A content management system for managing a web-based and non-web based marketing campaign using a blueprint, the system comprising:
   a memory for storing executable instructions; and
   a processor for executing the executable instructions, the executable instructions comprising:
      a plurality of external content provider modules each communicatively coupled via a network to an individual external content library;
      a blueprinting module that establishes a blueprint for a web-based and non-web marketing campaign using a content management system,
         the blueprint comprising rules for managing linkages of assets between at least a portion of a plurality of publications of a hierarchical model of the web-based marketing campaign utilizing the assets,
         the plurality of publications comprising a parent publication and a child publication, at least a portion of the assets utilized by the hierarchical model being stored on an external content library,
         the blueprint further comprising:
            localizing rules for automatically translating without manual translation changes in assets between the parent and child publications, and
            inheritance rules for:
               automatically inheriting in an unmodified format, including without the manual translation changes in the assets between the parent and child publications, based on a type of the assets, and
               automatically inheriting at least a portion of the changes to text metadata in an unmodified manner, including without translating the inherited portions of the changes to the text metadata, based on content of the portion of the changes; and
      an asset manager module that receives a change in an asset mapped from the external content library to the asset manager module for the parent publication,
         wherein the blueprinting module uses the linkage rules and the inheritance rules to automatically inherit in an unmodified form, including without translation of at least a portion of the change in the asset between the parent publication and the child publication, and uses the linkage rules and the localizing rules to automatically translate without manual translation the at least a portion of the change in the asset from the parent publication to the child publication and wherein the external content library is registered and mapped by:
            registering the external content library with the content management system using an external content provider module, whereby one or more content authors must present or verify their identity before accessing assets that reside on the external content library; and
            mapping assets of the external content library for use within the content management system.

19. The system according to claim 18, wherein the external content library is registered and mapped to the content management system via an external content provider module.

20. The system according to claim 19, wherein the external content provider module registers the external content library with the content management system and an asset mapper module maps the assets of the external content library for use within the content management system, and wherein the mapping of the assets of the external content library occurs at intervals to ensure that the assets are available and properly linked to web content.

21. The system according to claim 20, wherein upon selection of an asset from the external content library via the content management system, the asset mapper module maps the selected asset from the external content library into the web content being created on the content management system.

22. The system according to claim 18, wherein the localizing rules comprises any rule of translation, hiding, inheriting, pushing, or any combinations thereof, of assets for a publication.

23. The system according to claim 18, wherein a publication comprises any of assets, templates, functionalities, keywords, metadata, workflows, or any combinations thereof.

* * * * *